US012526303B2

(12) United States Patent
Dunn et al.

(10) Patent No.: US 12,526,303 B2
(45) Date of Patent: *Jan. 13, 2026

(54) INTELLIGENT PRIORITIZATION OF ASSESSMENT AND REMEDIATION OF COMMON VULNERABILITIES AND EXPOSURES FOR NETWORK NODES

(71) Applicant: Darktrace Holdings Limited, Cambridge (GB)

(72) Inventors: Matthew Dunn, Ely (GB); Maximilian Florian Thomas Heinemeyer, Lower Saxony (DE); Jake Lal, Cambridge (GB); Carl Joseph Salji, Bedford (GB)

(73) Assignee: Darktrace Holdings Limited, Cambridge (GB)

( * ) Notice: Subject to any disclaimer, the term of this patent is extended or adjusted under 35 U.S.C. 154(b) by 355 days.

This patent is subject to a terminal disclaimer.

(21) Appl. No.: 17/859,844

(22) Filed: Jul. 7, 2022

(65) Prior Publication Data

US 2023/0336581 A1    Oct. 19, 2023

Related U.S. Application Data

(63) Continuation-in-part of application No. 17/187,373, filed on Feb. 26, 2021, now Pat. No. 12,034,767, (Continued)

(51) Int. Cl.
*H04L 9/40* (2022.01)
*H04L 41/0816* (2022.01)

(52) U.S. Cl.
CPC ...... *H04L 63/1433* (2013.01); *H04L 41/0816* (2013.01); *H04L 63/1416* (2013.01)

(58) Field of Classification Search
USPC ..................................................... 726/22–25
See application file for complete search history.

(56) References Cited

U.S. PATENT DOCUMENTS 8,407,798 B1 * 3/2013 Lotem ..................... G06F 21/55
                                                          726/21
8,621,614 B2 * 12/2013 Vaithilingam ........ H04L 51/212
                                                          713/188

(Continued)

OTHER PUBLICATIONS

Patent Cooperation Treaty, International Search Report, Inernatioal pplicatoin No. PCT/US22/36386, 2 pages.

(Continued)

*Primary Examiner* — Kambiz Zand
*Assistant Examiner* — Mahabub S Ahmed
(74) *Attorney, Agent, or Firm* — Rutan and Tucker, LLP

(57) ABSTRACT

The node exposure score generator and the attack path modeling component are configured to cooperate to analyze the actual detected vulnerabilities that exist for that network node in the network, the importance of network nodes in the network compared to other network nodes in the network, and the key pathways within the network and the vulnerable network nodes in the network that a cyber-attack would use during the cyber-attack in order to provide an intelligent prioritization of remediation actions to remediate the actual detected vulnerabilities for each network node from the network protected by a cyber security appliance.

20 Claims, 8 Drawing Sheets

Related U.S. Application Data which is a continuation-in-part of application No. 17/004,392, filed on Aug. 27, 2020, now Pat. No. 11,709,944.

(60) Provisional application No. 63/219,026, filed on Jul. 7, 2021, provisional application No. 62/983,307, filed on Feb. 28, 2020, provisional application No. 62/893,350, filed on Aug. 29, 2019.

(56) References Cited

U.S. PATENT DOCUMENTS

| | | | |
|---|---|---|---|
| 8,881,288 B1* | 11/2014 | Levy | G06F 21/577 709/225 |
| 9,239,908 B1 | 1/2016 | Constantine | |
| 9,292,695 B1* | 3/2016 | Bassett | G06F 21/577 |
| 9,369,484 B1* | 6/2016 | Lacerte | H04L 63/1416 |
| 9,742,803 B1* | 8/2017 | Kras | G06F 21/56 |
| 10,268,821 B2 | 4/2019 | Stockdale | |
| 10,320,813 B1* | 6/2019 | Ahmed | H04L 63/1416 |
| 10,382,473 B1* | 8/2019 | Ashkenazy | H04L 63/1466 |
| 10,419,466 B2 | 9/2019 | Ferguson | |
| 10,601,865 B1* | 3/2020 | Mesdaq | H04L 63/1425 |
| 10,659,335 B1* | 5/2020 | Morris | H04L 43/50 |
| 10,701,093 B2 | 6/2020 | Dean | |
| 10,754,959 B1* | 8/2020 | Rajasooriya | G06N 7/01 |
| 10,848,515 B1* | 11/2020 | Pokhrel | H04L 63/1433 |
| 11,228,612 B2* | 1/2022 | Vajipayajula | H04L 63/1466 |
| 11,310,268 B2* | 4/2022 | Bowditch | G06N 20/00 |
| 2006/0021044 A1* | 1/2006 | Cook | H04L 63/1433 726/25 |
| 2006/0021046 A1* | 1/2006 | Cook | G06F 21/577 726/25 |
| 2006/0021047 A1* | 1/2006 | Cook | H04L 63/1433 726/25 |
| 2006/0021048 A1* | 1/2006 | Cook | H04L 63/1433 726/25 |
| 2006/0021050 A1* | 1/2006 | Cook | H04L 63/1433 726/25 |
| 2007/0192855 A1* | 8/2007 | Hulten | H04L 63/1483 707/E17.115 |
| 2008/0167920 A1* | 7/2008 | Schmidt | G06Q 90/00 705/7.42 |
| 2010/0058456 A1* | 3/2010 | Jajodia | G06F 21/552 726/11 |
| 2013/0198846 A1* | 8/2013 | Chapman | G06Q 10/0635 726/25 |
| 2013/0312101 A1 | 11/2013 | Lotem et al. | |
| 2013/0318616 A1* | 11/2013 | Christodorescu | G06F 21/552 726/25 |
| 2014/0075414 A1 | 3/2014 | Fox et al. | |
| 2015/0058993 A1* | 2/2015 | Choi | H04L 63/1433 726/25 |
| 2015/0287336 A1* | 10/2015 | Scheeres | G09B 5/02 434/156 |
| 2015/0381649 A1* | 12/2015 | Schultz | G06Q 10/0635 726/25 |
| 2016/0205122 A1* | 7/2016 | Bassett | H04L 63/1441 726/23 |
| 2016/0330238 A1* | 11/2016 | Hadnagy | H04L 63/1483 |
| 2017/0026388 A1* | 1/2017 | Gatti | H04L 63/1483 |
| 2017/0046519 A1* | 2/2017 | Cam | G06N 7/01 |
| 2017/0048266 A1* | 2/2017 | Hovor | H04L 63/1433 |
| 2017/0214701 A1* | 7/2017 | Hasan | H04L 63/1433 |
| 2017/0295197 A1 | 10/2017 | Parimi et al. | |
| 2018/0041537 A1* | 2/2018 | Bloxham | H04L 63/0263 |
| 2018/0124108 A1* | 5/2018 | Irimie | H04L 63/1483 |
| 2018/0219901 A1* | 8/2018 | Gorodissky | H04L 63/1433 |
| 2018/0295154 A1* | 10/2018 | Crabtree | H04L 63/1433 |
| 2018/0359272 A1* | 12/2018 | Mizrachi | H04L 67/535 |
| 2018/0367549 A1* | 12/2018 | Jang | G06N 5/022 |
| 2019/0014141 A1* | 1/2019 | Segal | H04L 63/1483 |
| 2019/0014149 A1* | 1/2019 | Cleveland | G06N 3/045 |
| 2019/0114245 A1* | 4/2019 | Mermoud | G06F 11/3466 |
| 2019/0171984 A1* | 6/2019 | Irimie | G06Q 10/0635 |
| 2019/0173917 A1* | 6/2019 | Sites | G06N 3/082 |
| 2019/0173918 A1* | 6/2019 | Sites | G06N 3/044 |
| 2019/0173919 A1* | 6/2019 | Irimie | H04L 63/1483 |
| 2019/0182266 A1* | 6/2019 | Doron | H04L 63/145 |
| 2019/0238571 A1* | 8/2019 | Adir | H04L 63/1425 |
| 2019/0245883 A1* | 8/2019 | Gorodissky | H04L 63/1433 |
| 2019/0260783 A1* | 8/2019 | Humphrey | H04L 63/0428 |
| 2019/0297096 A1* | 9/2019 | Ahmed | H04L 63/1441 |
| 2019/0342307 A1* | 11/2019 | Gamble | G06F 16/907 |
| 2019/0347578 A1* | 11/2019 | Bolding | H04L 63/1433 |
| 2019/0349400 A1* | 11/2019 | Bruss | G06F 21/53 |
| 2020/0034752 A1* | 1/2020 | Luo | H04L 51/42 |
| 2020/0177615 A1* | 6/2020 | Grabois | H04L 63/20 |
| 2020/0177617 A1* | 6/2020 | Hadar | G06F 21/552 |
| 2020/0177618 A1* | 6/2020 | Hassanzadeh | G06F 21/552 |
| 2020/0244673 A1 | 7/2020 | Stockdale | |
| 2020/0267183 A1* | 8/2020 | Vishwanath | H04L 63/1483 |
| 2020/0358798 A1* | 11/2020 | Maylor | H04L 63/1433 |
| 2020/0379079 A1* | 12/2020 | Dupray | H04W 64/00 |
| 2020/0380115 A1 | 12/2020 | Knight et al. | |
| 2021/0012012 A1* | 1/2021 | Soroush | G06N 5/04 |
| 2021/0014256 A1* | 1/2021 | Malhotra | H04L 63/1433 |
| 2021/0021629 A1* | 1/2021 | Dani | H04L 63/1433 |
| 2021/0029154 A1* | 1/2021 | Picard | H04L 63/1441 |
| 2021/0029164 A1* | 1/2021 | Albero | H04L 63/20 |
| 2021/0092153 A1* | 3/2021 | Wei | H04L 47/29 |
| 2021/0273958 A1 | 9/2021 | McLean | |
| 2021/0281596 A1* | 9/2021 | Covell | H04L 63/1483 |
| 2021/0367962 A1* | 11/2021 | Kurowski | G06F 21/577 |
| 2021/0409449 A1* | 12/2021 | Crabtree | H04L 63/1408 |
| 2022/0394053 A1* | 12/2022 | Sorani | G06F 21/57 |

OTHER PUBLICATIONS

United States Patent and Trademark Office, Non-Final Office Action, Aug. 3, 2023, 49 pages.

United States Patent and Trademark Office, Non-Final Office Action, Sep. 29, 2022, 87 pages.

European Patent Office, European Search Report, 12pp, dated Dec. 12, 2024.

* cited by examiner

INTELLIGENT PRIORITIZATION OF ASSESSMENT AND REMEDIATION OF COMMON VULNERABILITIES AND EXPOSURES FOR NETWORK NODES

RELATED APPLICATION

This application claims the benefit of and priority under 35 USC 119 to U.S. Provisional Application No. 63/219,026 filed Jul. 7, 2021, entitled A CYBER SECURITY APPLIANCE AND OTHER SECURITY TOOLS, and priority under 35 USC 120 to U.S. Non-provisional Application Ser. No. 17/187,373 filed Feb. 26, 2021, entitled AN ARTIFICIAL INTELLIGENCE ADVERSARY RED TEAM, which claims priority as continuation-in-part application under 35 CFR 120 of U.S. non-provisional patent application "AN INTELLIGENT ADVERSARY SIMULATOR," filed Aug. 27, 2020, application Ser. No. 17/004,392, which claims priority to and the benefit of under 35 CFR 119 of U.S. provisional patent application titled "ARTIFICIAL INTELLIGENCE BASED CYBER SECURITY SYSTEM," filed Aug. 29, 2019, application No. 62/893,350, as well as also claims priority to and the benefit of under 35 CFR 119 of U.S. provisional patent application titled "An Artificial Intelligence Based Cyber Security System," filed Feb. 28, 2020, application No. 62/983,307, which are incorporated herein by reference in its entirety.

NOTICE OF COPYRIGHT

A portion of this disclosure contains material that is subject to copyright protection. The copyright owner has no objection to the facsimile reproduction by anyone of the material subject to copyright protection as it appears in the United States Patent & Trademark Office's patent file or records, but otherwise reserves all copyright rights whatsoever.

FIELD

Embodiments of the design provided herein generally relate to a cyber security detection system. In several embodiments, one or more artificial Intelligence (AI) processes may be implemented with an AI adversary red team to generate phishing emails to pentest defenses of an email defense system and/or a network defense system.

BACKGROUND

Common Vulnerabilities and Exposures (CVE) can include a list of publicly disclosed information security vulnerabilities and exposures. CVEs can identify and categorize vulnerabilities in software and firmware. In CVEs, a vulnerability can be a weakness that can be exploited in a cyber-attack to gain unauthorized access to or perform unauthorized actions on a computer system. Vulnerabilities can allow attackers to run code, access system memory, install different types of malware and steal, destroy, or modify sensitive data, etc. An exposure can be a mistake that gives an attacker access to a system or network. Exposures can lead to data breaches, data leaks, and personally identifiable information (PII) being sold on the dark web. CVEs can be shared information about known vulnerabilities so that cybersecurity strategies can be updated with the latest security flaws and security issues.

SUMMARY

In an embodiment, a node exposure score generator can compute, via a mathematical function, a network node's exposure to a cyber threat that originates external to a network, which is then supplied into an attack path modeling component. Each network node's exposure to the cyber threat is based on at least actual vulnerabilities that are detected to exist on that network node. The attack path modeling component can i) understand an importance of network nodes in the network compared to other network nodes in the network, and ii) to determine key pathways within the network and vulnerable network nodes in the network that a cyber-attack would use during the cyber-attack, via modeling the cyber-attack on at least one of 1) a simulated device version and 2) a virtual device version of the network under analysis.

The node exposure score generator and the attack path modeling component can cooperate to analyze the actual detected vulnerabilities that exist for that network node in the network, the importance of network nodes in the network compared to other network nodes in the network, and the key pathways within the network and the vulnerable network nodes in the network that a cyber-attack would use during the cyber-attack in order to provide an intelligent prioritization of remediation actions to remediate the actual detected vulnerabilities for each network node from the network protected by a cyber security appliance. A remediation suggester can cooperate with the attack path modeling component to analyze the actual detected vulnerabilities that exist in a particular network node and suggest how to intelligently prioritization remediation actions on the particular network node compared to other network nodes with actual detected vulnerabilities in at least one of a report and an autonomous remediation action initiated by the remediation suggester to fix an actual detected vulnerability.

These and other features of the design provided herein may be better understood with reference to the drawings, description, and claims, all of which form the disclosure of this patent application.

BRIEF DESCRIPTION OF DRAWINGS

The above, and other, aspects, features, and advantages of several embodiments of the present disclosure will be more apparent from the following description as presented in conjunction with the following several figures of the drawings. The drawings refer to embodiments of the present disclosure in which.

Figure 1:
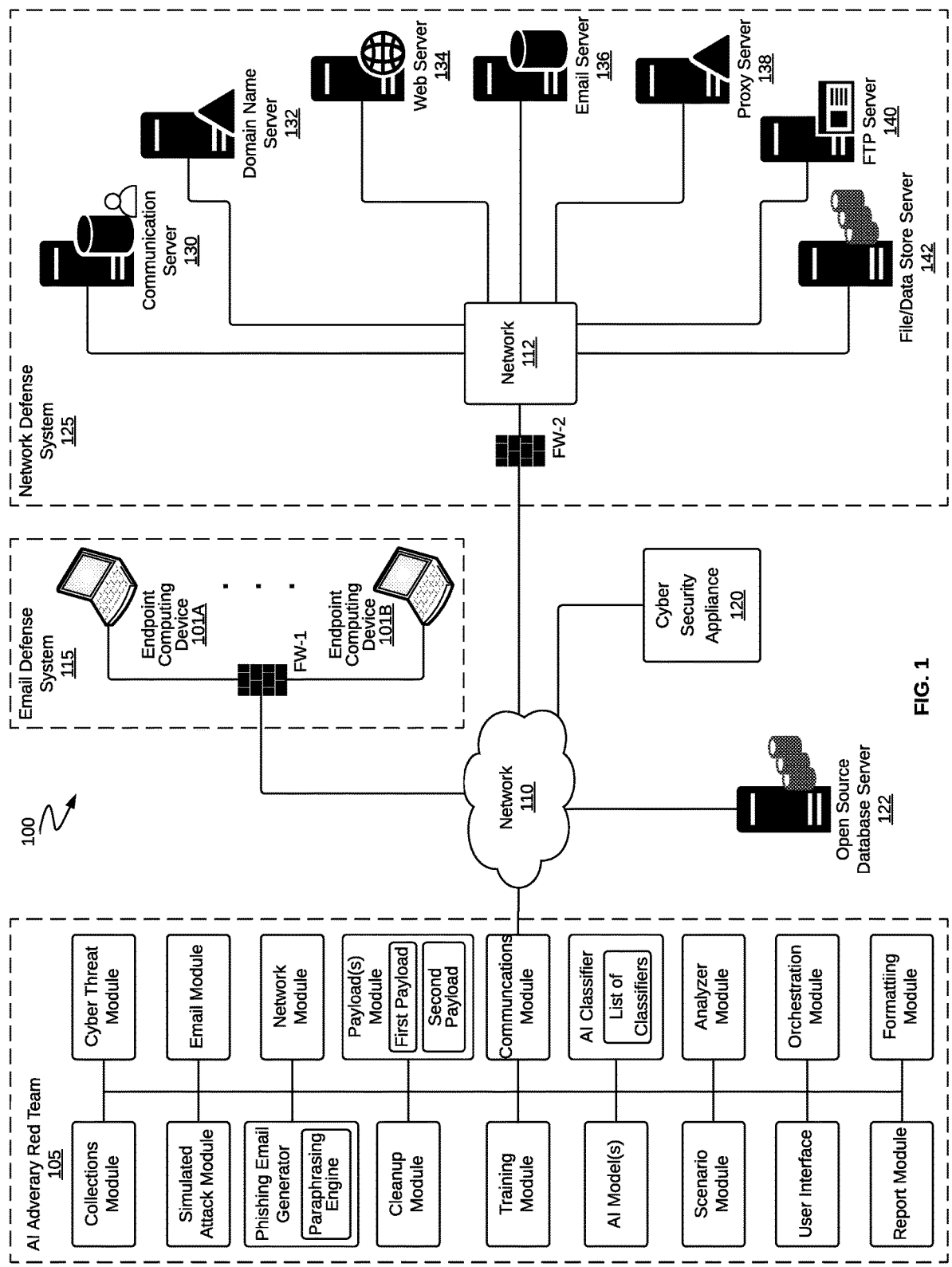
FIG. 1 illustrates an example embodiment of a block diagram of an AI cyber threat security system having an AI adversary red team configured to cooperate with a cyber security appliance to pentest on one or more cyber defense systems, in accordance with an embodiment of the disclosure.

While the design is subject to various modifications, equivalents, and alternative forms, specific embodiments thereof have been shown by way of example in the drawings and will now be described in detail. It should be understood that the design is not limited to the particular embodiments disclosed, but—on the contrary—the intention is to cover all modifications, equivalents, and alternative forms using the specific embodiments.

DESCRIPTION

In the following description, numerous specific details are set forth, such as examples of specific data signals, named components, number of servers in a system, etc., in order to provide a thorough understanding of the present design. It will be apparent, however, to one of ordinary skill in the art that the present design may be practiced without these specific details. In other instances, well known components or methods have not been described in detail but rather in a block diagram in order to avoid unnecessarily obscuring the present design. Further, specific numeric references such as a first server, may be made. However, the specific numeric reference should not be interpreted as a literal sequential order but rather interpreted that the first server is different than a second server. Thus, the specific details set forth are merely exemplary. Also, the features implemented in one embodiment may be implemented in another embodiment where logically possible. The specific details may be varied from and still be contemplated to be within the spirit and scope of the present design. The term coupled is defined as meaning connected either directly to the component or indirectly to the component through another component.

Figure 7:
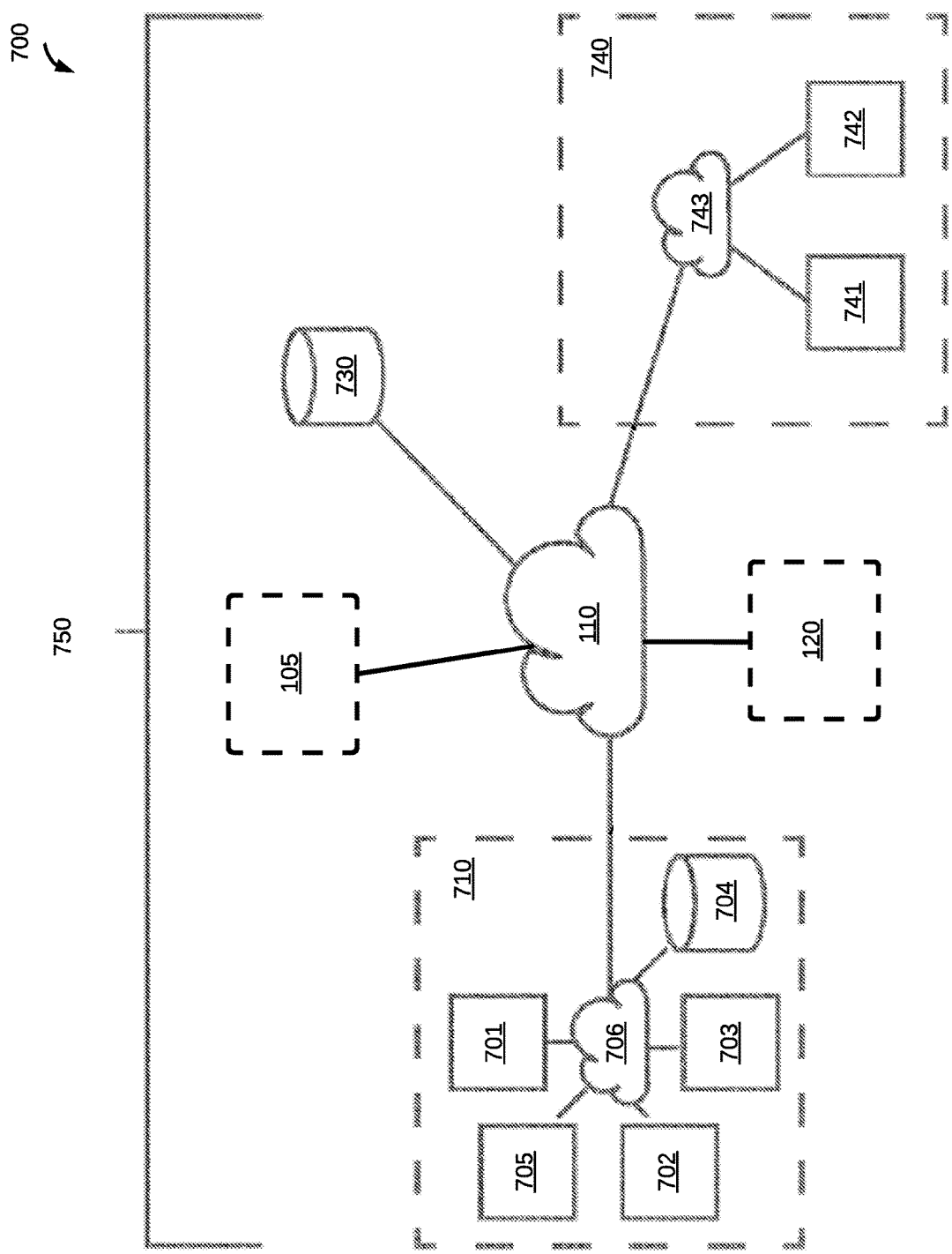
FIG. 7 illustrates an example embodiment of a block diagram of an exemplary cyber threat defense system having an AI adversary red team used to pentest and train one or more computer systems connected to a network.
Figure 8:
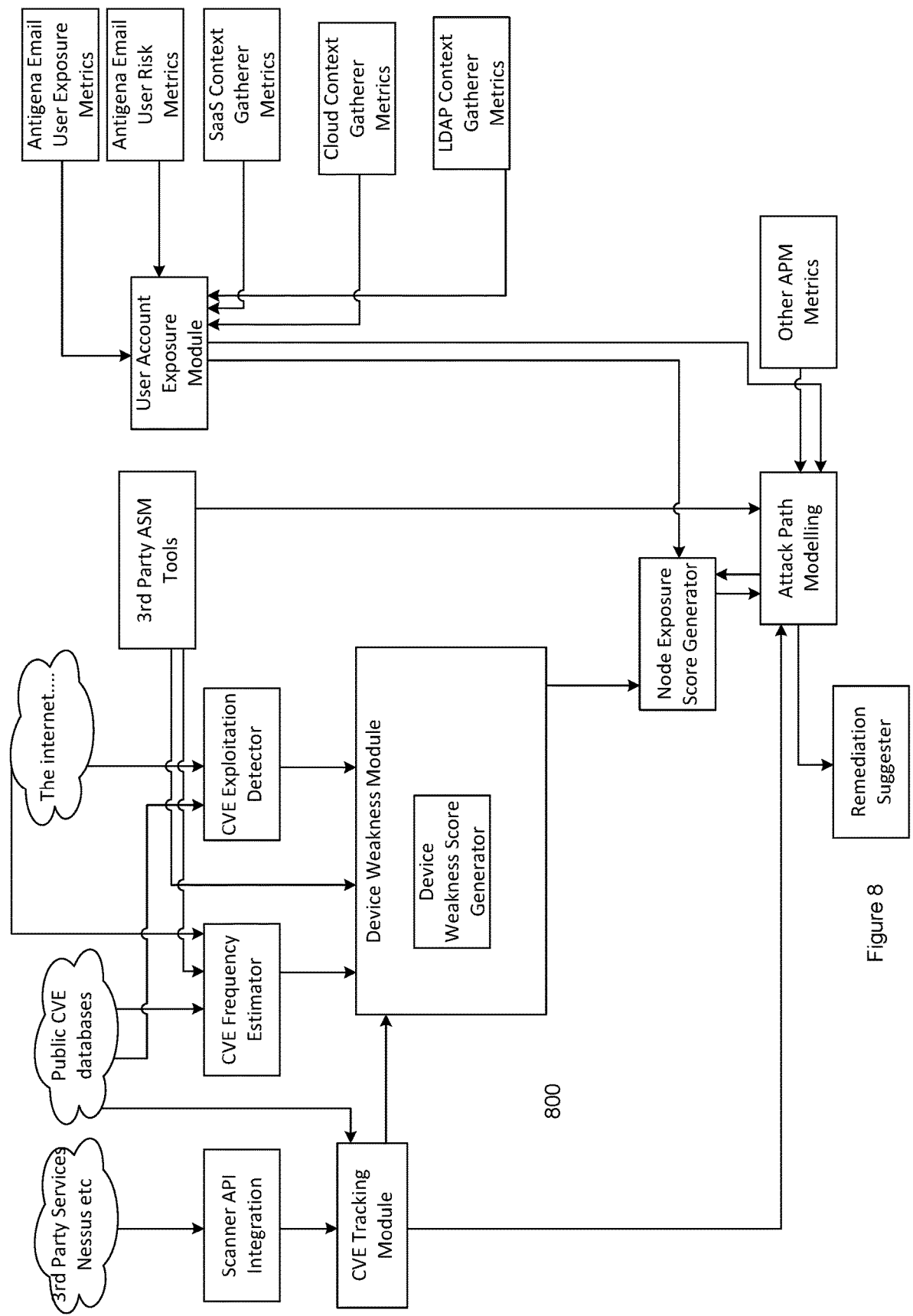
FIG. 8 illustrates an example embodiment of a block diagram of a cyber threat defense system that includes a node exposure score generator and the attack path modeling component cooperating to analyze the actual detected vulnerabilities that exist for each network node, the importance of network nodes in the network compared to other network nodes in the network, and the key pathways within the network and the vulnerable network nodes in the network that a cyber-attack would use during the cyber-attack in order to provide an intelligent prioritization of remediation actions to remediate the actual detected vulnerabilities for network nodes.

FIG. 8 illustrates an example embodiment of a block diagram of a cyber threat defense system that includes a node exposure score generator and the attack path modeling component cooperating to analyze the actual detected vulnerabilities that exist for each network node, the importance of network nodes in the network compared to other network nodes in the network, and the key pathways within the network and the vulnerable network nodes in the network that a cyber-attack would use during the cyber-attack in order to provide an intelligent prioritization of remediation actions to remediate the actual detected vulnerabilities for network nodes. Many sources of third party vulnerability information of a network node's exposure to an attack from different cyber threats exist. For example, third party services like Nessus, etc. can provide CVE information. The Internet has lots of third party vulnerability information on a network node's exposure to an attack from different cyber threats. Public CVE databases can provide third party vulnerability information of a network node's exposure to an attack from different cyber threats. Third party Application Security Monitoring (ASM) tool can perform cyber-attack monitoring for vulnerabilities and attacks. The cyber threat defense system 800 can include various components including a scanner Application Programming Interface (API) integrator module, a CVE tracking module, a CVE frequency estimator module, a CVE exploitation detector module, a device weakness module, a node exposure score generator, a user account exposure module, an attack path modeling component, and a remediation suggester module. The modules and components discussed in FIG. 8 may be substantially similar to modules and components in the cyber security appliance 120 and the AI adversary red team module 105 depicted above in FIGS. 1-7.

The Common Vulnerabilities and Exposures (CVE) frequency estimator module, the CVE exploitation detector module, and/or the scanner API integrator module can use a set of APIs to request or be pushed vulnerability information so that the device weakness module is going to be looking at multiple different types of vulnerabilities including misconfigurations in software, default and/or reuse passwords, denial-of-service vulnerabilities, etc., from different sources, such as third party ASM tools, 3rd party asset management and vulnerabilities services, public CVE databases, and scrapes of the Internet. These vulnerabilities could allow unauthorized control or access to sensitive data on a system.

The scanner API integrator module can ingest data from third party asset management and vulnerability services such as Nessus, so the system can know when an example network device (e.g. server device) matches up to the network under analysis and has vulnerable software (e.g. weak Operating System) and/or other known CVEs (a list of publicly disclosed computer security flaws), which would make them vulnerable to compromise from an external cyber threat to the network. Likewise, 3rd party services, like Microsoft defender can see product information and can gather that information and submit it back via the APIs. The scanner API integrator module, the CVE tracking module, the CVE frequency estimator module, and the CVE exploitation detector are configured to take in CVE information on known (and even previously unknown) externally facing network nodes in the network under analysis from hooks into these third party vulnerability sources.

Some example CVEs can include:

Vulnerabilities that could allow unauthorized control or access to sensitive data on a system including the Operating System and/or other software operating/resident on the network device is out of date with respect to patches or just regular vulnerabilities that a web service might have once a month generated because of add-ons or plugins.

Misconfiguration of settings in the software and/or device (e.g. open mail relay, missing patches, etc.);

Default passwords, a few common passwords, blank/absent passwords on some system accounts, using the same passwords on multiple different sites; and/or Denial-of-service vulnerabilities, etc.

In an embodiment, the scanner API integrator module can also scan the perimeter of the network and feed in data from externally exposed nodes. The scanner API integrator module can scan the external surface of the network, detecting anything that appears to belong to the network (or is typo-squatting, or malicious).

The scanner API integrator module can use a set of tools to scan the Internet for vulnerability information as well as a set of APIs to receive vulnerability information from public CVE databases to incorporate third party vulnerability information into the computation of the network node's exposure made by the node exposure score generator to the cyber threat and the cyber-attack modeling conducted by the attack path modeling component on the at least one of 1) the simulated device version and 2) the virtual device version of the network under analysis.

In an embodiment, the third party services provide the information to the scanner API integrator module and then that is supplied into the CVE tracking module.

The CVE tracking module can use tables, databases, logic, and other tools to track CVEs for each network device in the network. The CVE tracking module can interface with the APIs to third party vulnerability scanners, via the scanner API integrator module, and then also feeds its data downstream into both the device weakness module and the attack path modeling component so that the modeling and remediation suggester module are aware of the literal CVEs by name of what specifically needs to be remediated.

The CVE tracking module uses tools to track individual vulnerabilities to the cyber-attack on the network nodes that are network devices. The CVE tracking module can track and profile versions of software and a state of patches and/or updates compared to a latest patch and/or update of the software resident on network devices in the network. The CVE tracking module supplies results of the comparison of the version of the software as an actual detected vulnerability for a network node when that out of date software actually subjects the software as a CVE. The results of the comparison of the version state of each software resident on a network device are utilized by the node exposure score generator and the attack path modeling component in the prioritization of remediation actions on that network node compared to the other network nodes with actual detected vulnerabilities.

Note, the network nodes in the network can include both network devices as well as user accounts.

The CVE tracking module can profile the software running on endpoint devices and other externally exposed entities by various means (seeing what libraries are loaded in the browser/making requests to servers on specific ports/ making requests to certain endpoints). The CVE tracking module can feed back that data into the device weakness module to make an estimate on the weakness of external systems (e.g., if a server is running a software with significant CVEs).

The CVE tracking module via the scanner API integrator module can contact and/or scan each network device internal within the network being protected for its software resident on that device. The CVE tracking module can interface directly with the network devices which can also report their current configurations. The CVE tracking module can receive vulnerability information from, for example, the Public CVE databases and look at reports and compare the software resident on network devices and their current configurations over to best practices within the industry.

The CVEs associated with the Operating Systems and what software are running on the device can be tracked as well as all of the CVEs fixed or remedied by the relevant software updates and/or patches required for each network device. Thus, the CVE tracking module can look at the Operating System and its version as well as any software being used, which can be compared to the information obtained from the third party services.

The CVE tracking module can make some estimations about the software running on the network devices (e.g. external webservers) based upon their behavior in traffic, their interactions (and also indirect information, e.g., from when a cloud user creates a resource, the CVE tracking module can see the resource type, and it may be something like a web gateway.

The CVE tracking module tracks and outputs two sets of information. One output of information is to a device weakness module. The device weakness module is going to calculate device weakness scores and update the frequency derivation. A second output of information is supplied into the attack path modeling component (e.g. AI red team simulator, clone creator in virtual environment, etc.) to incorporate into the modeling of a cyber-attack on the network.

In an embodiment, the cyber security appliance monitoring and protecting the network can also be used as a source to supply vulnerability information.

The CVE frequency estimator module can use tables, databases, logic, equations, and other tools to track a frequency of updates of software resident on each network device in the network on their own. (E.g. the user or the system updates the software on the network device on their own). The CVE frequency estimator module can use logic, equations, and tracking tables to estimate a time period for software on each specific network device is updated on its own compared to another time period of when an update is available to be installed on that particular network device; and thus, track and determine for that specific network device a likelihood that this network device will be updated to a latest version of the software on its own and the typical or average time period this updating process takes to occur.

Again, the CVE frequency estimator module, the CVE exploitation detector, and the scanner API scraper contact various external information sources to request the information and/or to be pushed this information to these modules. For example, most of the 3rd party ASM tools will provide an API to provide information such as particular types of attack detections that can be made on an external facing node as well as tell these modules about weaknesses vulnerabilities.

The CVE frequency estimator module both tracks a frequency of updates on each device in the network for each software application and OS on that device, and predicts the frequency of updates based upon how many updates that exist on third party update websites and based upon what the logic has seen in public CVE databases as well as by calculating the periodicity, as well as the update track record for that specific device. The CVE frequency estimator can then determine that there's a likelihood that, for example, this operating system will again be out of date and vulnerable in 'x' amount of time and/or this operating system which is currently out of date will be updated on its own in 'y' amount of time. The CVE frequency estimator can also determine what is the probability of another weakness vulnerability occurring within the next period of time.

The CVE frequency estimator module can compare what is the best practice for updates/patches compared to what is the history of this specific network device currently has, and that delta in that comparison is information which feeds its way into the calculations of the device weakness score in the device weakness module.

The CVE frequency estimator module constantly tracks and receives registered vulnerabilities in a certain period, maybe let's say once a month. Note, even when there are no weaknesses today communicated to the CVE frequency estimator module that still gives the module historical information about the potential for vulnerabilities for that bit of software, and a period for discovering something new within it.

The CVE frequency estimator module and/or CVE tracking module can also detect misconfigurations from for example 3rd party ASM tools and compare that to a current state of patches, updates, and current settings, on each device being tracked. For example, settings and updates in JavaScript libraries in use can be examined and the corresponding vulnerabilities with those JavaScript libraries can then be determined.

The CVE frequency estimator module can analyze historical information for each network device and/or each different software to see whether, for example, a sharp decrease occurs or it's never decreasing and essentially the analysis works out whether that network device is getting updated and/or how quick it is getting updated.

The CVE frequency estimator module can also store historical weakness scores and then can estimate how often the device is being updated compared to available updates based on that historical weakness score.

The CVE frequency estimator module can also predict the likelihood that, for example, an operating system would have future CVEs based upon information in public CVE databases and the wider Internet, e.g. what patches are available and the historical track record for that Operating System.

The CVE frequency estimator module can scrape public databases of updates and make logical deductions such as we know that frequently there are lots and lots and lots of updates for Microsoft Exchange because there are typically CVEs that are fed in.

The CVE exploitation detector module uses similar tools as the other modules to get information from, for example, public CVE databases and what hacking tools and other cyber threats to launch a cyber-attack are available on the Internet, and then estimates the likelihood of those CVEs are being exploited.

The CVE frequency estimator module and the CVE exploitation detector are configured with APIs and other scanning tools to receive inputs from the Internet and 3rd party ASM tools. This integration with the third party services, Internet scraping, and third party ASM tools allows a way to identify externally facing nodes—devices and/or user accounts, in a network and their vulnerabilities to a cyber-attack from outside/external to the network. The device weakness module uses that information and analysis from the CVE frequency estimator module and the CVE exploitation detector module to compute and feed that into the weakness of the attack surface even on devices in the network that were previously unknown as an external facing component. The external facing component can be communicated with directly from a malicious cyber threat that comes from external to the network.

The CVE exploitation detector module receives inputs from the third party ASM tools, the input from the Internet, and references the public CVE databases to figure out various things. The third party ASM tools utilize their processes to identify this network device as an externally facing device, such as a web server, endpoint user device that connects to the Internet, etc., as well as an identification of this user account as an externally facing node comes from user metrics such as email exposure, from the SaaS Context Gather, etc. The CVE exploitation detector module or another module can supply this information to the device weakness module to factor into its assessment of each network device under analysis and the attack path modeling component to use in its cyber-attack modeling.

The CVE exploitation detector is configured to predict how likely the CVE exploit is to be actually, exploited, which has its feed of, for example, public CVE data on the Internet and public CVE databases. The mathematical function computes the likelihood scores based on frequency and terms coming up in those searches from the Internet and public CVE databases.

The CVE exploitation detector module scrapes the Internet for popular hacking tools and sees what they choose to exploit. For example, when the CVE exploitation detector module is seeing a surge in terminology and security issues, surrounding, for example, LDAP, SaaS, etc., then the CVE exploitation detector module can infer that a certain vulnerability is being exploited with that user account and/or network device using those user account services.

These third party sources of information can provide and/or push information on the behavior to reuse passwords, and then the CVE exploitation detector module can compare and deduce password reuse likely occurs in other places. In addition, the CVE exploitation detector module can look at communication traffic and infer password reuse. For example, when the CVE exploitation detector module has a hook into an email system, either the network's own email system or a third party's email system being accessed from users of the network, then the CVE exploitation detector module can look at what emails users are receiving. Note, there is a direct correlation between the types of information such as mailing list subscribes and higher statistical reuse of passwords. When a user is signed up to numerous newsletters, then statistically there's a higher probability that the user is reusing their password credentials.

The CVE exploitation detector module can also receive lists from 3rd party services of when someone's passwords are being expelled to the Internet and match that up to devices associated with the user's in this network as well as their user accounts. In addition, this module can look at other communication traffic and make inferences as well. Again, when a user is signed up numerous newsletters, then there is a higher probability that this user is reusing their password credentials.

The device weakness module can update frequency derivations and generate an overall device weakness score for each network device. The device weakness module and the user account exposure module ingest third party attack surface management information on network nodes including externally exposed network nodes. The CVE frequency estimator module, the CVE exploitation detector, and the CVE tracking module all supply their outputs into the device weakness module and its device weakness score computation that computes how weak each specific device in the network is. All three of those inputs are fed into the device weakness score calculation and also the output from the third party ASM tools about what's being exposed—what software that is running is also fed into the device weakness module. This score also works out and factors in how frequently devices have been updated on their OS and other software resident on that device.

The device weakness score is generated based on what CVEs, the kind of CVE actually detected and how critical each CVE is that is associated with each separate network device, what software updates are required for each device, and other factors discussed herein. The device weakness score generator basically calculates those in a mathematical function and generates an overall score based on how bad it thinks that CVEs are on that network device. The device weakness score generator can also factor in those vulnerabilities that are associated with that network device, the update frequency to remedy those vulnerabilities, and historical weakness scores over time; and then, it stores these device weakness scores over time.

In an embodiment, the device weakness score uses various weights that went into generating that score. The function uses variables with criticalness of the weakness identified where each CVE has its own critical level, along with the expectation in frequency and data as well. All of this data is used to estimate "weakness" of a network node which can also factor in an externally facing node status for the attack path modeling.

The user account exposure module has hooks and receives input for email user exposure metrics, email user risk metrics, SaaS context metrics and risks, Cloud context metrics and risks, and on premises LDAP account metrics and risks from various sources. The cyber security appliance monitoring and protecting the network can also supply a lot of this information. The user account exposure module is configured to take in CVE information from internal assessment tools as well as 3rd party services to collate CVE information from this network's user account services like email accounts, SaaS context, etc.

The user account exposure module uses tables, databases, logic, and equations, to track individual vulnerabilities to one or more cyber-attacks when the network nodes are the user accounts. The user account exposure module and the CVE tracking module are configured to keep track of each individual vulnerability on each specific network node by name so that then the attack path modeling component and later the remediation suggester module can identify that specific vulnerability and know on a certainty level within a context of this particular network, under analysis, why it is important and how to remediate and how to prioritize the actually detected vulnerabilities on that node compared to the other network nodes in the network with actual detected vulnerabilities.

Thus, the user account exposure module collects and evaluates a weakness of user accounts such as email accounts, SaaS services used and permissions, Cloud user accounts, and evaluates their exposure. The user exposure module supplies its input into the node exposure score generator and an attack path modeling feedback loop.

Most if not all user accounts are externally facing and subject to potential cyber-attacks from outside the network. However, the user account exposure module can make an estimation of how externally facing, for example, an email mailbox account can be based on things like a volume of emails, email addresses like recipients in the company, how that email account receives malicious emails, etc. The user account exposure module performs a similar analysis for the SaaS accounts, Cloud accounts, and Active Directory accounts such as LDAP accounts, all in a similar way to the email account. E.g. how many applications and their level of authorization does the user have in that environment in comparison to the rest of the users in the network and produce a score at the end. There are some ways to evaluate the likelihood of compromise of user accounts in a network automatically internally. For example, gathering email data on externally exposed email addresses (a classification is done on a volume of inbound mail to assume "externally" facing mailboxes) from the cyber security system protecting the network. Using the SaaS context gatherer tools to detect the permissions associated with a user, the authentication methods the user uses, how many groups the user is a member of, etc. Also, SaaS risk and remediation can include how many permissions the user has, what roles the user has (e.g. an administrator) in the context of the rest of the organization.

Next, the user account exposure module supplies an output down directly into the attack path modeling component. The user account exposure module supplies the exact vulnerabilities identified in each user account so that the remediation suggester module can specifically identify what vulnerability in the user account needs to be fixed/remediated and the cyber-attack can be modelled with those actually detected vulnerabilities. Thus, the user account exposure module gathers data across multiple different accounts, whether it be the Cloud, the email network, the SaaS account, etc. and once the user account exposure module identifies those vulnerabilities, then assess them and put a score on to them.

The device weakness module and the user account exposure module combine to calculate the risk associated for common vulnerabilities and exposures actually detected for the device/user/account, along with the user account exposure module and the CVE tracking module combining to identify the particular vulnerabilities that the system has actually discovered.

The node exposure score generator receives the outputs of the device weakness module and the user account exposure module. Thus, the device weakness score from the device weakness module is inputted into the node exposure score generator to seed attack path modeling; and, likewise the score from the user account exposure module is inputted into the node exposure score generator. The node exposure score generator uses the data in the computation of device weakness and the attack path modeling makes use of this data its own calculations of the possibility of future critical vulnerability CVEs and the possibility of those CVEs being exploited. The vulnerabilities and the scores from the user accounts and the network devices are fed as input parameters that are seeded into the modeling of the cyber-attack through the network by an attack path modeling framework.

The node exposure score generator can compute, via a mathematical function, a network node's exposure to a cyber threat that originates external to a network, for each network node in the network, which is then supplied into an attack path modeling component. Each network node's exposure to the cyber threat is based on at least actual vulnerabilities that are detected to exist on that network node. In an embodiment, the node exposure score generator computation can factor both the node's exposure and an importance of that node in the network compared to other nodes in the network, which then goes into the attack path modeling simulation which can also incorporate other metrics.

A node exposure score generator can also factor in whether the specific network node, under analysis, is exposed to direct contact by an entity generating the cyber threat external to the network or that network node, under analysis, is downstream of a network node exposed to direct contact by the entity generating the cyber threat external to the network.

In an embodiment, the node exposure score generator is configured to initially generate just a general weakness score, which is then going to be fed into the attack path modeling so it can then customize the weakness and importance of all of the user accounts and/or network devices under analysis.

The node exposure score can be a normalized score on a network node irrelevant of what type of network node—network device and/or user account.

Note, when doing calculations, the device weakness module and the user exposure module can look at both an amount of CVEs associated with the network device/user account and a level of severity of each CVE detected on that network node and then a delta difference between being not compromised along with factoring how dangerous is the exposure based on the severity of the CVE. Note, these can all be turned into a score so the artificial intelligence in the attack path modeling can take this as an input. In addition, knowing the name of the actual CVEs is helpful when conducting the attack path modeling simulation as well as when reporting out the remediation suggestion.

The mathematical functions in the user account exposure module and the device weakness module are set in respect to each other to correlate a lot of different systems, whether it be IT network devices, user accounts including SaaS accounts, Active Directory internal login permissions and many other accounts and then put a commonality between the scores, so that the system can assess them on the same level. The user account exposure module and the CVE tracking module are configured to keep track of each individual vulnerability out there by name so that then the attack path modeling simulation and later remediation suggester module can identify that particular/specific vulnerability and know on a certainty level within the context of this particular network then why it's important and how to remediate and how to prioritize what is the most important to remediate in light of the existing CVEs in this particular network.

The device weakness score generator, the node exposure score generator, and the user account exposure module each supply output information factored into the attack path modeling simulation on the network. These modules supply third party CVE information, actual network device and user account operating information to enhance attack path modeling simulation in order to best intelligently prioritize remediation actions.

The attack path modeling component can be programmed to work out the key paths and devices in a network via running cyber-attacks on a simulated or virtual device version of the network under analysis incorporating metrics that feed into that modeling. The attack modeling has been programmed with the knowledge of a layout and connection pattern of each particular network device in a network and an amount of connections and/or hops to other network devices in the network. Also, how important a particular device (a key importance) can be determined by the function of that network device, the user(s) associated with that network device, the location of the device within the network and an amount of connections and/or hops to other important devices in the network. The attack path modeling component ingests the information for the purposes of modeling and simulating a potential attack against the network and routes that an attacker would take through the network. The attack path modeling component can be constructed with information to i) understand an importance of network nodes in the network compared to other network nodes in the network, and ii) to determine key pathways within the network and vulnerable network nodes in the network that a cyber-attack would use during the cyber-attack, via modeling the cyber-attack on at least one of 1) a simulated device version and 2) a virtual device version of the network under analysis.

The node exposure score generator and the attack path modeling component cooperate to analyze the actual detected vulnerabilities that exist for that network node in the network, the importance of network nodes in the network compared to other network nodes in the network, and the key pathways within the network and the vulnerable network nodes in the network that a cyber-attack would use during the cyber-attack in order to provide an intelligent prioritization of remediation actions to remediate the actual detected vulnerabilities for each of the network nodes from the network protected by a cyber security appliance.

The attack path modeling component is configured to determine the key pathways within the network and the vulnerable network nodes in the network that the cyber-attack would use during the cyber-attack, via the modeling of the cyber-attack on at least one of 1) the simulated device version and 2) the virtual device version of the network under analysis via using the actual detected vulnerabilities of each network node, a predicted frequency of remediation of those vulnerabilities within a specific network device in the network without a notice from the remediation suggester module, and an importance of the key network nodes with the actual vulnerabilities compared to other network nodes in the network.

The attack path modeling component is programmed to factor into the intelligent prioritization of remediation actions a current device weakness based on the actual detected vulnerabilities, alongside the attack path modeling making its own calculations of a possibility of the actual detected vulnerabilities being exploited, along with the likelihood that this network device will be updated to the latest version of the software on its own.

The modules can identify and seed the information on potential vulnerabilities across multiple different user accounts and network devices, whether it be the IT network devices, the email network, or the SaaS account, etc. and once the system identifies those vulnerabilities and puts an initial assessment on them via a score, and look at particular anticipated vulnerabilities as well as detected actual vulnerabilities that exist on network nodes and run the modeling of the cyber-attack with this network and these vulnerabilities over and over to eventually produce results for the remediation suggester module to suggest actions in a prioritized order to take along with why to do those actions in order to improve the security of this network and its external facing accounts based on actual vulnerabilities. The modules essentially seed the attack path modeling component with weakness scores that provide current data, customized to each user account and/or network device, which then allows the artificial intelligence running the attack path simulation to choose entry network nodes into the network with more accuracy as well as plot the attack path through the nodes and estimated times to reach critical nodes in the network much more accurately based on the actual current operational condition of the many user accounts and network devices in the network. The attack simulation modeling can be run to identify the routes, difficulty, and time periods from certain entry notes to certain key servers.

Using the data and results of the attack path modeling simulation, the remediation suggester module generates possible high impact actions to take in the context of this specific network to remediate these vulnerabilities, which are all couched in the context of the attack path modeling's output of which are the most important key paths to key devices in light of their actual computer vulnerabilities on those key devices.

In an embodiment, the node exposure score generator and the attack path modeling component can share a feedback loop to provide externally facing nodes, including network devices as well as user accounts for email, SaaS, Active Directory, and/or Cloud permissions, etc., from the actual network protected by the cyber security appliance, risk and remediation assessment and then put that risk and remediation assessment into action through a report to the user to take on the discovered vulnerabilities and/or autonomous action to take on the discovered vulnerabilities.

In an embodiment, the attack path modeling component can use the intelligent adversary simulation data by running an adversary simulator over and over again on all external facing Internet connections to the network.

The attack path modeling component can be run on those Internet facing nodes with the actual risks found on those nodes. For example, the attack path modeling component cooperating with the node exposure score generator identifies which Internet facing devices that are running, based on an assessment of their kind of operating system, a risky operating system, such as not up to date on its patches, which Internet facing devices are risky because attack surface identification determines a same set credentials are used by this user over and over again in different accounts across different platforms by this device, etc.

The remediation suggester module working with the attack path modeling component can deduce based on the knowledge the modules and attack path modeling are giving it, how to prioritization remediation actions in a report and/or autonomous remediation activity fix the problem.

Ingesting CVEs is useful in the context of knowing the particular current operational states of the user accounts and network devices in this particular network. This attack path simulation is using information specific to each user and each device as of their current operating state to obtain more accurate simulation results; and thus, better real life suggested remediations to take intelligent prioritization of network nodes, including externally facing nodes, for risk and remediation assessment. Fixing externally facing nodes that have direct contact with sources external to the network generally have a higher prioritization than network nodes that do not have direct contact with external sources. The system has data on the weakness of all device and users in the network (not just external ones). The system is not limited to just suggest remediations for the external facing nodes in intelligent prioritisation. The system also suggests remediation of internal nodes if, for example, an internal node is very weak and can be used as a stepping stone immediately after lots of external nodes.

The remediation suggester module cooperates with the attack path modeling component to analyze the actual detected vulnerabilities that exist in each network node and suggests how to intelligently prioritization remediation actions on each network node compared to other network nodes with actual detected vulnerabilities in at least one of a report and an autonomous remediation action initiated by the remediation suggester module to fix one or more of the actual detected vulnerabilities.

The report can be conveyed in an electronic format in a communication to a user, on a display screen viewed by a user, and/or in a printed format. The remediation suggester module can generate a report that tells the user all of the possible and most likely routes through the network based on the actual vulnerabilities. The report identifies the possible entry network nodes and routes that are actually more likely based on current CVE identified with the devices and/or user accounts.

The remediation suggester module is programmed to take autonomous actions of at least one of 1) initiating and causing an update of the state of patches and/or updates to the latest patch and/or update for a first software resident on the first network device and 2) generating a notice to a user of a first user account, whom has been determined to reuse passwords across multiple user accounts, that the user must change their password.

In an embodiment, the remediation suggester module can be based upon the scores that come out of the attack path modeling simulation, the scores that come out of the node exposure score generator, the specific CVEs identified by the CVE tracker module's output, and the specific CVEs identified by the user account exposure module's output and then use default settings, user programmed in settings, and/or artificial intelligence to determine and to prioritize what is the best decision to make with this information.

Again, the CVE tracking module has a direct input over to the attack path modeling component (e.g. AI red team module) to assist in the remediation that is going to be suggested and/or autonomously taken. The remediation suggester module knows now what CVEs are actually detected; and thus, relevant on the network device.

The remediation suggester module looks at actual vulnerabilities that exist in the network, and then suggests in the report or autonomously itself takes the steps on how to go ahead and improve the security of this particular network, under analysis, and the network's external exposed devices and external facing user accounts.

For example, the prioritization of the action to take is not simply saying fix this particular vulnerability because it is listed somewhere as a critical action to take, rather the report conveys fix this particular vulnerability on this particular externally exposed device/user/account because the results of the attack path modeling show a cyber-attacker can reach all of your major key devices in three days based on that specific vulnerability which currently exists on that particular network node. The contextually intelligent recommendation is based on a realistic expectation of what the lateral movement that attacker would perform when the cyber-attack enters the network. Also, rather than the report saying this vulnerability is bad and to dedicate resources to fix all the network nodes with this vulnerability, the output from the attack path modeling with the known vulnerabilities communicates a particular set of devices that are, for example, externally exposed that need this fix ASAP and then the set of other network nodes will be essentially completely isolated from the external threat when the externally exposed network nodes are fixed. For example, an old printer not connected directly to the Internet would be indicated as a low priority node to fix even though it might have the same or worse vulnerabilities detected on that printer than the external facing nodes being suggested as high priority network nodes to fix. In another example, the report suggests remediation to the user that the mitigation of CVE '1234' on server 'A' will actually remove a significant percentage of risk as that was the main entry point for high scoring attack paths. The remediation suggester module may also automatically take the example remediation actions of reducing the permissions associated with a SaaS account to a level that prevents the cyber-attack pathway into the network until the identified vulnerability is fixed by the user.

The report can identify all systems/entities that represent the prioritized, 'external' attack surface' (e.g. Internet facing servers, vulnerable web applications, overly exposed users, weakly secure SaaS accounts,) that are subject to targeted attack scans against the perimeter in a prioritized list with the associated reasoning. The remediation suggester module identifies in a report and/or on a display screen that devices are Internet facing and some risks found with that Internet facing device. The report can then present these to a user and suggest remediation actions and/or take autonomous actions that actually restore portions of the network (heal). The inventory of devices identified by the attack path modeling component can be displayed to the end user with potential remediation suggestions.

In general, the embodiments described herein include an AI cyber-threat defense system having an attack path modeling component (e.g. AI adversary red team module) for generating one or more automated and customizable cyber attacks to pentest one or more defenses implemented in a network, which can include email and IT network devices, endpoint devices, network servers and databased, network addresses, user agents, domain addresses, file directories, communication ports, analysts, end users, etc.). As used herein, an attack path modeling component (e.g. AI adversary red team module) may refer to at least one or more of an apparatus, an appliance, a simulator, an extension (or agent), a service, a module, etc., that may combine one or more cooperating modules, engines, and so on, which may be implemented from both AI trained intrusion prevention and intrusion detection systems. For example, as used herein, the AI cyber-threat defense system may implement the AI adversary red team modelling as an attack module as well as a training module depending on the desired goals of the respective organization (e.g., as shown with the AI adversary red team module 105 in FIG. 1), while a cyber security appliance may be implemented as a cyber threat detection and protection module (e.g., as shown with the cyber security appliance 120 in FIG. 1).

In some embodiments, the AI adversary red team module is configured to create the network in a simulated or virtual device environment to train and/or attack an organization such as a company, an enterprise network, etc. In several embodiments as described below, the AI adversary red team may be configured to cooperate with the cyber security appliance to obtain specific data about specific users, devices, and entities in specific (and generally secured) networks in specific defense systems of specific organizations. Based on those several embodiments, the AI adversary red team may use the obtained specific data to generate one or more specific cyber attacks, such as a phishing email, tailored to those specific users, devices, and/or entities of the specific organization. Many different cyber attacks can be simulated by the AI red team module but a phishing email attack will be used as an example cyber attack.

Referring now to FIG. 1, an AI cyber threat security system 100 having an AI adversary red team module 105 is communicatively coupled to a cyber security appliance 120, an open source (OS) database server 122, an email defense system 115 with one or more endpoint computing devices 101A-B, and a network defense system 125 with one or more entities 130-142, over one or more networks 110/112, is shown, in accordance with an embodiment of the disclosure. As described above, the AI cyber threat security system 100 may cooperate with the AI adversary red team module 105 to initiate a pentest in the form of a software attack, which generates a customized, for example, phishing email to spoof one or more specific users/devices/entities of an organization in an email/network defense system and then looks for any security vulnerabilities, risks, threats, and/or weaknesses potentially gaining access to one or more features and data of that specific user/device/entity.

In some embodiments, the AI adversary red team module 105 may be implemented as an automated red team simulator (or simulation) of a sophisticated threat actor attack with one or more customizable components of that attack. The AI adversary red team module 105 may be customized and/or driven by a centralized AI using and/or modelling a smart awareness of a variety of specific historical email/network behavior patterns and communications of a specific organization's hierarchy within a specific organization. Such AI modelling may be trained and derived through machine learning and the understanding of the organization itself based on: (i) a variety of OS materials such as any OS materials collected from the OS database server 122 and (ii) its historical awareness of any specific email/network connectivity and behavior patterns to target for that organization as part of an offensive (or attacking) security approach.

For example, the AI adversary red team module 105 may use an orchestration module (or the like) to implement and orchestrate this offensive approach all the way from an initial social engineering attack at an earlier stage of the pentest to a subsequent payload delivery attack at a later stage of the pentest and so on, as described below in further detail. Similarly, in other embodiments, the AI adversary red team module 105 may be implemented as an automated offensive to: (i) intelligently initiate a customized attack on one or more specific security postures of an organization; (ii) subsequently highlight, report, and/or raise awareness of one or more key areas of vulnerabilities and/or risks for that organization after observing the intelligently initiated attack (e.g., such key areas may be formatted and reported in a way tailored for that organization using both the formatting and reporting modules, as described below); and (iii) then allow that organization to be trained on that attack and its impact on those specific security postures, thereby allowing that organization to go in directly to mitigate and improve those compromised security postures going forward. For example, after the customized attack has been initiated, the adversary red team module 105 may use the result of the phishing simulation to thereby trigger a network simulation (and/or the like) and then produce a report of that network simulation for that organization using the formatting and reporting modules, where the report may highlight to the organization and others which users were spoofed by the phishing simulation(s)—and, if desired, simulate a customized attack from the device(s) of those user(s) and then report on this simulation.

In several embodiments, the AI adversary red team module 105 may cooperate with the cyber security appliance 120 to provide feedback on any successful attacks and detections. For example, in the event that the AI adversary red team module 105 is successful in pentesting any of the organization's entities in the email and network defense systems 115/125, the AI adversary red team module 105 may be configured to at least provide the cyber security appliance 120 (and/or any other predetermined entities) with any feedback on the successful pentest as well as any specifics regarding the processes uses for that successful pentest, such as providing feedback on the specific attack vectors, scenarios, targeted entities, characteristics of the customized phishing emails, payloads, and contextual data, etc., that were used. Similarly, if the cyber security appliance 120 detects an attack in progress, the cyber security appliance 120 may be configured to provide the AI adversary red team module 105 with any feedback on the successful detection as well as how the attack was successfully detected (and/or any other feedback that may be beneficial to the AI adversary red team 105).

Accordingly, this positive and negative reinforcement substantially improves the overall defenses of the AI cyber threat security system 100, such that the AI adversary red team module 105 is facilitated to modify any specifics and/or contextual information used for the phishing emails, payloads, attack vectors, etc., while also facilitating the cyber security appliance 120 to tune any specific vulnerabilities and processes in light of its detection mechanisms. In this manner, the AI adversary red team module 105 may help expose holes or flaws in an organization's security postures that could be exploited by a malicious actor. Particularly, in this manner, the AI adversary red team module 105 helps the AI cyber threat security system 100 to identify exactly "how" vulnerable and/or to "what" extent those customized phishing email attacks can go and the overall "actual" impact observed from executing those attacks on the organization's specific security postures— without the substantial overall increase of expenses and testing time generally required when high-end red team professionals are hired. Lastly, the AI adversary red team module 105 also helps organizations to create specified risk-modeling scenarios for all of its organizational aspects and entities, which may include: (i) Who is specifically vulnerable in this organization? (ii) Which specific defenses, groups, entities, networks, and so on, are specifically vulnerable in this organization? (iii) What specific type of data is at risk in this organization? (iv) What is the specific degree or extent of severity when/if this organization is attacked (i.e., How vulnerable is this specific organization to any potential attacks)?

Referring back to FIG. 1, the email defense system 115 may include one or more endpoint devices 101A-B depicted as one or more portable computing devices (e.g., laptops), which may be operable under the umbrella of an organization's email network such as the client, institute, company, and/or the like. The email defense system 115 may be implemented to protect all the endpoint devices 101A-B and any other entities that may connect to this organization's email network to communicate and transmit data between each other. For example, the AI cyber security defense system 100 may configure the email defense system 115 to protect all the endpoint computing devices, external/internal email network(s), email-based entities (e.g., such as backup email databases), and/or any other external/internal network systems associated with the organization's email network systems and so on, by detecting and analyzing any particular email connectivity and behavior patterns that are unseal and/or anomalous to those email network systems under analysis. In an example, a behavioural pattern analysis of what are the unusual behaviours of the network/system/ entity/device/user under analysis by the machine learning models may be as follows.

The AI cyber threat security (or defense) system 100 as well as the email and network defense systems 115/125 may use any unusual detected behaviour deviating from the normal behaviour and then build a sequence/chain of unusual behaviour and the causal links between the sequence/chain of unusual behaviour to detect any potential cyber threats. For example, these defense systems 100/115/ 125 may determine the unusual patterns by analyzing i) what activities/events/alerts that fall outside of the window of what is the normal pattern of life for that network/system/ entity/device/user under analysis; and (ii) then pulling in and analysing the pattern of the behaviour of the activities/ events/alerts that are in the normal pattern of life but also connect to the indictors for a possible cyber attack, to determine whether that pattern is indicative of a behaviour of a malicious actor, such as a human, program, and/or any other cyber harmful threat.

Again, these systems 100/115/125 may then return and retrieve some of the filtered out normal activities to help support and/or refute a possible hypothesis of whether that pattern is indicative of a behaviour of a malicious actor. For example, these systems 100/115/125 may use an analyzer module (or the like) to cooperate with one or more AI models trained on cyber threats and their behaviour to try to determine if a potential cyber threat is causing these unusual behaviours. If the pattern of behaviours under analysis is believed to be indicative of a malicious actor, then a score of how confident is the system in this assessment of identifying whether the unusual pattern was caused by a malicious actor is created. Thereafter, such defense systems 100/115/125 may also have a scoring module (or the analyzer module itself) configured to assign a threat level score or probability indicative of what level of threat does this malicious actor pose (e.g., as shown with the scores depicted in the graph 600 of FIG. 6). Lastly, any of these defense systems 100/115/125 may be configurable through a user interface (UI), by a user, analyst, and/or the like, used to establish one or more predetermined parameters (or inputs), if any, regarding what type of automatic response actions, if any, such modules in such defense systems 100/115/125 should take when different types of cyber threats, indicated by the pattern of behaviours under analysis, are equal to and/or above a configurable threshold level of threat posed by this malicious actor.

As such, the endpoint devices 101A-B in the email defense system 115 may be accessible and communicatively coupled to the AI adversary red team 105, the cyber security appliance 120, and/or the entities 130-142 in the network defense system 125 via the network 110, the second firewall (FW-2) (or the front-end firewall FW-2), and the network 112. For example, as shown in FIG. 1, it should be observed that the endpoint devices 101A-B may communicate with the one or more entities 130-142 in the network defense system 125 respectively through each of the first and second firewalls FW-1/FW-2 as well as each of the first and second networks 110/112. Similarly, the AI adversary red team module 105 may communicate with the entities 130-142 in the network defense system 125 via the network 110 (e.g., the Internet), the front-end firewall FW-2, and then the network 112. As noted above, in some embodiments, the AI adversary red time 105 may interact with any of the entities 130-142 to both/either: (i) pentest those entities for training and/or detection purposes, and/or (ii) collect (or query, ingest, probe, etc.) any particular data associated with those entities 130-142 that may be used to generate the customized cyber attack (E.g. phishing emails, payload attacks, etc.).

Furthermore, the endpoint devices 101A-B may be communicatively coupled to the cyber security appliance 120 via the first firewall defense (FW-1) and the first network 110, and to any of the entities 130-142 in the network defense system 125 via the second firewall FW-2 and the second network 112. In most embodiments, each of the devices 101A-B may be resident of its own respective host endpoint agents (e.g., as shown with the host endpoint agents 211A-B on the endpoint computing devices 201A-B depicted in FIG. 2). The endpoint devices 101A-B may include, but are not limited to, a mobile phone, a tablet, a laptop, a desktop, Internet of Things (I) appliance, and/or the like. In an embodiment, the endpoint device 101A may be configured to operate substantially similar to the endpoint device 101B or configured to operate different from the endpoint device 101B based on different user roles, permissions, hierarchical relationships, peer groups, etc., in that organization.

In some embodiments, the networks 110/112 may be implemented as an informational technology network, an operational technology network, a cloud infrastructure, a SaaS infrastructure, a combination thereof, and/or any other type of network capable of communicatively coupling one or more entities/endpoint devices to one or more other entities/endpoint devices. For example, at least one or more of the networks 110/112 may also include one or more networks selected from, but not limited to, an optical network, a cellular network, the Internet, a Local Area Network (LAN), a Wide Area Network (WAN), a satellite network, a cloud-based network, a fiber network, a cable network, any combinations thereof, and/or any other communications network capable of communicatively coupling the one or more endpoint devices 101A-B, the AI adversary red team module 105, and/or the cyber security appliance 120 to the OS database server 122 and any of the other entities (or servers) 130-142.

As shown in FIG. 1, the cyber security appliance 120 may include multiple modules configured to cooperate with each other in conjunction with one or more modules residing in the endpoint devices 101A-B, the AI adversary red team module 105, and/or the various entities 130-142 in the network defense system 125. Furthermore, as described below in greater detail in FIG. 4, the cyber security appliance 120 may include one or more modules that may be similar to the one or more modules implemented in the AI adversary red team module 105. Such modules of the cyber security appliance 120 may be used to: (i) gather/collect data from the endpoint devices 101A-B and any other associated endpoint computing devices, users, and/or entities; (ii) analyze and score the gathered data; (iii) train AI and/or machine learning model(s) with the analyzed/scored data; (iv) determine, if any, autonomous response(s) based on the comparison between the analyzed/scored data and the trained data; (v) trigger the determined autonomous response(s), if any, directly on the respective host endpoint agents on the respective endpoint devices 101A-B; and (vi) communicate those triggered response(s), if any, with the users associated with those respective endpoint devices 101A-B. Whereas, other modules of the cyber security appliance 120 may be used to display data, metrics, etc., regarding other host endpoint agents residing on other respective local endpoint computing devices, where such data may be unified as translated data from those endpoint computing devices and the endpoint devices 101A-B.

The cyber security appliance 120 may be configured with various modules that reference at least one or more AI and/or machine learning models (e.g., as shown with the AI models depicted in FIG. 4), which may be trained on any normal patterns of life, potential cyber threats, behavior patterns (i.e., behavior pattern of life), host endpoint agents, and/or network patterns of life observed from various/all entities in order to protect such entities from any cyber threats within the AI based cyber threat security system 100. As such, the cyber security appliance 120 may cooperate with multiple (or all) modules and/or instances of the endpoint devices 101A-B, the entities 130-142, and/or the AI adversary red team module 105 to defend such entities, devices, users, and so on, that are communicatively coupled to one or more of the networks 110/112.

For example, the cyber security appliance 120 may use the at least one or more AI/machine learning models to analyze the pattern of life data for each endpoint device 101A-B and/or each entity 130-142, where each endpoint device 101A-B and entity 130-142 may be communicatively connected to one or more application programming interfaces (APIs) hosted by the cyber security appliance 120. This allows the cyber security appliance 120 to implement those AI/machine learning models trained on the respective endpoint computing devices 101A-B and entities 130-142 to: (i) analyze the collected pattern of life data for the respective host endpoint agents and the respective entity modules connected to the respective APIs hosted by the cyber security appliance 120; and (ii) then compare that analyzed pattern of life data against a normal pattern of life observed for those respective endpoint computing devices 101A-B and entities 130-142. Accordingly, this cooperation between the cyber security appliance 120 and the endpoint devices 101A-B and entities 130-142 may be used to protect against any unusual cyber security threats that may arise from maliciously harming networks, maliciously harming process chains, and so on—as well as any unusual cyber security threats that may arise from any of the pentesting in the form of customized phishing emails, payloads, attacks, and so on, implemented by the AI adversary red team module 105.

As shown in FIG. 1, the network entities 130-142 in the network defense system 125 may be accessible to the AI adversary red team module 105, the cyber security appliance 120, and/or the endpoint devices 101A-B in the email defense system 115 respectively via the network 110, the firewall FW-2, and the network 112. Similarly, the AI adversary red team module 105 may access any of the respective entities 130-142 in the network defense system 125 via the network 110 (e.g., the Internet), the front-end firewall FW-2, and the network 112.

As shown in FIG. 1, the entities 130-142 residing in the network defense system 125 may include, but are not limited to, a communication server 130, a domain name server (DNS) 132, a web server 134, an email server 136, a proxy server 138, an FTP Server 140, and a file server 142. Each of the entities 130-142 may be connectable via an internal client network such as the network 112. In some embodiments, more than one or more of the entities 130-142 may be associated with its own internal client network (not shown), where each client network may represent an organizational sub-section, department, peer group/team, and so on. Optionally, various of these internal client networks may be further protected behind one or more other internal firewalls (not shown). Note that, in other embodiments, the various entities 130-142 may be further associated with one or more additional client networks, each performing client functions or representing various sub-organization within an organization's network deployment.

Furthermore, as described above, the OS database server 122 may be connectable and used to periodically query, search, and retrieve specific data (or data points) pertaining to the organization and all its entities. For example, such OS data may be used by the AI adversary red team module 105 to generate the customized cyber attacks such as phishing emails, and other attack scenarios, and so on, using up-to-date contextual knowledge of that specific organization and all its specific entities, users, devices, etc. In some embodiments, the AI adversary red team module 105 may use the network 110 such as the Internet to gather specific data for specific data points for that organization, which may then be used by the trained AI models and/or AI classifiers for generating various attack scenarios and/or the like (as described below in further detail).

In most embodiments, the AI adversary red team module 105 may include various modules cooperating with each other to generate a variety of customized cyber attack scenarios (e.g. phishing emails) used to then pentest at least one or more of the endpoint devices 101A-B and/or the entities 130-142 in the respective email and network defense systems 115/125. As shown in FIG. 1, the various cooperating modules residing in the AI adversary red team module 105 may include, but are not limited to, a collections module, a cyber attack generator (e.g. phishing email generator with a paraphrasing engine), an email module, a network module, an analyzer module, a payloads module with first and second payloads, a communication module, a training module, a simulated attack module, a cleanup module, a scenario module, a UI, a reporting module, a formatting module, an orchestration module, an AI classifier with a list of specified classifiers.

As described herein, the AI adversary red team module 105 may be implemented as an AI adversary red team simulator configured to pentest one or more defenses configured by the AI cyber threat defense system 100. The AI adversary red team module 105 may include and cooperate with one or more AI models trained with machine learning on the contextual knowledge of the organization. These trained AI models may be configured to identify data points from the contextual knowledge of the organization and its entities, which may include, but is not limited to, language-based data, email/network connectivity and behavior pattern data, and/or historic knowledgebase data. As noted above, the AI adversary red team module 105 may use the trained AI models to cooperate with one or more AI classifier(s) by producing a list of specific organization-based classifiers for the AI classifier.

For example, the list of specific organization-based classifiers may be configured based on the organization, the available OS data, the various customizable scenario attacks and phishing emails, and so on. In some embodiments, the specific organization-based classifiers may include one or more default (or predetermined) classifiers in conjunction with one or more customized classifiers. Furthermore, in several embodiments, the list of specific organization-based classifiers implemented by the AI adversary red team module 105 may include, but are not limited to, (i) a context classifier, (ii) a natural language classifier, (iii) a historic knowledgebase classifier, (iv) an OS classifier, (v) an industry group classifier, (vi) a domain classifier, (vii) an attack vectors classifier, and (viii) a hierarchical relationship classifier. For example, the context classifier may be configured to use text trained on a content for a body of an email for that organization; the natural language classifier may be configured to use text trained on a natural language for that organization; the historic knowledgebase and/or OS classifiers may be configured to use text trained on any historical information and/or publicly available information for that organization; the industry group classifier may be configured to use text trained on a particular industry group and/or its particular industry-based terminology for that organization; the domain classifier may be configured to use text trained on a variety of spoofing domains for that organization; the attack vectors classifier may be configured to use text, objects, and visual representations trained on potential spoofing cyber threats for that organization; and the hierarchical relationship classifier may be configured to use text trained on identifying a high-level/low-level employee structure (e.g., management employees vs. entry (or subordinate) employees) based on all of the collected employee titles and roles for that organization.

These specific AI-based classifiers are helpful for generating successful automated and customizable phishing emails. For example, these AI-based classifiers allow the AI adversary red team module 105 to be able to: (i) scan a body of an email, a press article, an OS document, a website, and so on; (ii) retrieve (or classify, filter, etc.) the specific data/information needed by that specific AI-based classifier; and (iii) then coordinate with other modules to gather all this specific data from all the specific classified/filtered data points to thereby generate various customized attack scenarios and phishing emails from that specific data of those specific data points. Also, although eight AI-based classifiers are described above, it should be understood that the AI adversary red team module 105 may use any number and any type of AI-based classifiers, without limitations.

In several embodiments, the AI adversary red team module 105 may include a phishing email generator configured to generate one or more automated phishing emails to pentest the email defense system 105 and/or the network defense system 125. The phishing email generator may be configured to cooperate with the trained AI models to customize the automated phishing emails based on the identified data points of the organization and its entities. For example, these customized phishing emails may be used to then at least initiate one or more specific attacks on one or more specific users in the organization.

For example, the phishing email generator may use one or more "phishing" determinations to generate the customized phishing emails, including, but not limited to, (i) determining the specifics of each email system for that organization, such as determining specific targeted users, categorized email groups, and so on; (ii) determining the specifics of each IT network systems for that organization, such as determining the IT network systems, firewalls, backdoors, and/or any other similar security defenses; and (iii) determining the specifics of the hierarchal relationships, structures, and such for that organization, such as identifying and assessing the organization's name, the user names, the email signatures, the body content and other data from the users emails, content between various users, etc.

In some embodiments, the AI adversary red team module 105 may include a paraphrasing engine configured to receive email data from the identified data points and then break up that received email data into different segments of an email. For example, the segments of the email may include a subject line, a body content, and a signature line. The paraphrasing engine may be further configured to rephrase the text, objects, and/or visual representations from that received email data, such that one or more particular segments of some customized phishing emails are altered and/or slightly different from one or more particular segments of other customized phishing emails.

In several embodiments, the AI adversary red team module 105 may include a payload module configured to cooperate with the phishing email module in order to generate at least one or more of a first payload and a second payload, which may be attached to the one or more customized phishing emails. As noted above, the first payload may be configured as a non-executable payload, and the second payload may be configured as a executable payload a with a link to 'faux a malicious website.' In some embodiments, the AI adversary red team module 105 may include a training module configured to cooperate with the payload module.

In several embodiments, the AI adversary red team module 105 may include a simulated cyber-attack module configured to use the second payload attached to the customized phishing emails to thereby pentest, for example, the network defense system 125 and its entities 130-142. For example, this simulated second payload may be successfully activated and thus executed on that device and onto that network, where such simulated second payload may be tracked in that network by: (i) tracking beacon signals being produced from that payload, (ii) tracking a specific pattern of TCP packets being produced from that payload in the traffic spans; and/or (iii) using other similar network tracking/monitoring processes. Again, the network being tested may be a simulated version and/or a virtual version of the actual network being protected by the cyber security appliance 120.

In some embodiments, the simulated cyber-attack module may be configured to cooperate with the one or more trained AI models to customize the one or more specific attacks in light of the one or more specific attack scenarios configured for that network defense system 125 and its entities 130-142. These specific attack scenarios may be implemented by a scenario module residing in the AI adversary red team 105. The scenario module may be configured to cooperate with an orchestration module as well as the one or more trained AI models to generate the one or more specific attack scenarios. Furthermore, the generated specific attack scenarios may be particularly customized based on, for example, the email and network connectivity and behavior pattern data observed for any of the specific organizational entities in the AI cyber threat defense system 100.

In several embodiments, the AI adversary red team module 105 may include an analyzer module configured to cooperate with the AI classifier in producing the list of the specific organization-based classifiers, as described above. The analyzer module may be configured to cooperate with the one or more trained AI models to identify one or more normal pattern of life for the one or more entities of the organization in the email and network defense systems 115/125. In an embodiment, the AI adversary red team module 105 may also include a communications module configured to cooperate with the analyzer module and communicate with one or more APIs hosted by the cyber security appliance 120. In several embodiments, one or more of the AI adversary red team module 105 and/or the cyber security appliance 120 may include a profile manager module configured to communicate and cooperate with one or more modules of the AI adversary red team 105.

For example, the profile manager module may be configured to maintain a profile tag on each entity of the organization connecting to a network under analysis (e.g., one or more of the first and second networks 110/112) based on its email and network connectivity and behavior pattern data, such that the profile manager module may be configured to then supply any profile tags for any of the entities "actually" connecting to and/or being pentested in the network under analysis. Furthermore, in some embodiments, the AI adversary red team module 105 may include a collections module configured to monitor and collect specific organization-based data from multiple software processes executing on, for example, one of more of the host endpoint agents residing on the respective endpoint computing devices 101A-B in the cyber threat defense system 100. The communications module and the collections module may cooperate with each other to send all of the email and network connectivity and behavior pattern data to the cyber security appliance 120 regarding the specific organization-based data monitored and collected from those respective endpoint computing devices 101A-B connecting to the one or more networks 110/112 under analysis.

In several embodiments, the AI adversary red team module 105 may include a network module configured to cooperate with one or more IT, Cloud, SaaS, etc. network probes ingesting traffic data for network entities, network devices, and network users in the network defense system 125. The AI adversary red team module 105 may also include an email module configured to cooperate with one or email probes for ingesting email traffic data for email entities, email devices, and email users in the email defense system 115. Additionally, the profile manager module may be configured to maintain the profile tags on each of those entities, devices, and users based on their behavior pattern data observed by the email and network modules and/or the trained AI models modelling the normal pattern of life for those entities, devices, and users in the respective email and network defense systems 115/125, thereby obtaining the specific email and network connectivity and behavioral knowledge/patterns for each specific user, device, and entity in that specific organization.

In some embodiments, the collections module may be configured to cooperate with the communication module as well as the analyzer module to gather external data from the OS database server 122 (and/or the like), which allows the collection module to thereby collect and gather specific data for that organization, its entities, and its users. As described above, the OS database server 122 may include at least one or more of (i) an online professional networking platform for organizations and users, (ii) an online website of an organization with pages of their industry groups, teams, and users, and (iii) an online public search database. Lastly, in several embodiments, the AI adversary red team module 105 may include a cyber threat module configured to reference one or more machine-learning models trained on potential cyber threats in conjunction with the trained AI models and AI classifiers. The cyber threat module may be configured to cooperate with at least one or more of the payload module, scenario module, and/or simulated attack module to generate the specific attack scenarios executed and pentested by the AI adversary red team module 105 into the email and network defense systems 115/125 of the cyber threat defense system 100. Also, as described above for some embodiments, the UI module may be configured to cooperate with the orchestration module to provide one or more user input parameters specifically tailored to the organization and specified by a particular user in that organization.

For example, these user input parameters provided by the UI module may include: (i) a first parameter configured to identify a predetermined attack to pentest the cyber threat defense system; (ii) a second parameter configured to select a predetermined user and entity to be attacked with the identified predetermined attack; (iii) a third parameter configured to establish a predetermined threshold to execute the identified predetermined attack on the selected predetermined user and entity; and (iv) a fourth parameter configured to restrict one or more predetermined users and entities in the organization from being attacked. Also, in some examples, the predetermined threshold may be configured based on at least one or more of (i) a predetermined time schedule allowed for that attack, (ii) a predetermined maximum number of paths allowed for that attack, and (iii) a predetermined maximum number of compromised users, devices, and entities allowed for that attack.

In these embodiments, the payload module may be used to detect lateral movement of any compromised (or infected) entities. Respectively, in those embodiments, the cleanup module may then be used to clean up (or wipe) any entities that were compromised by either the initial activation of the payload (i.e., by having that user being spoofed to click on that payload) and/or the subsequent execution of that payload from that initial (or source) entity to any other entities, such as and other paths, devices, networks, domains, and so on, that have been compromised as the threat of that payload spreads through the network under analysis. Additionally, in some embodiments, the cleanup module (e.g. a remediation suggester module) may also be configured and used to clean up when/if a vulnerability threshold is triggered in that network under analysis (i.e., the vulnerability threshold may be predetermined by a particular user in that organization, such as an IT analyst or the like).

For example, the cleanup module may be particularly configured with one or more automated responses/actions such as, but not limited to, (i) resetting any compromised passwords, (ii) clearing any residual information from the respective phishing emails, (iii) shutting down any compromised entities, (iv) sending alerts to any particular users associated with those compromised entities and any IT analysts (or the like) for that organization, and (v) any other predetermined responses/actions. Note that, in most embodiments, the cleanup module may only be needed (or applicable) when/if the payload module is configured to "actually" execute those payloads during the later stages of the pentesting.

Note that, according to most embodiments, any instructions of any modules of the endpoint devices 101A-B shown in FIG. 1 may be scripted to be stored in an executable format in one or more memories and implemented by one or more processors of the respective endpoint computing devices, implemented in electronic circuits, and any combination of both.

Figure 2:
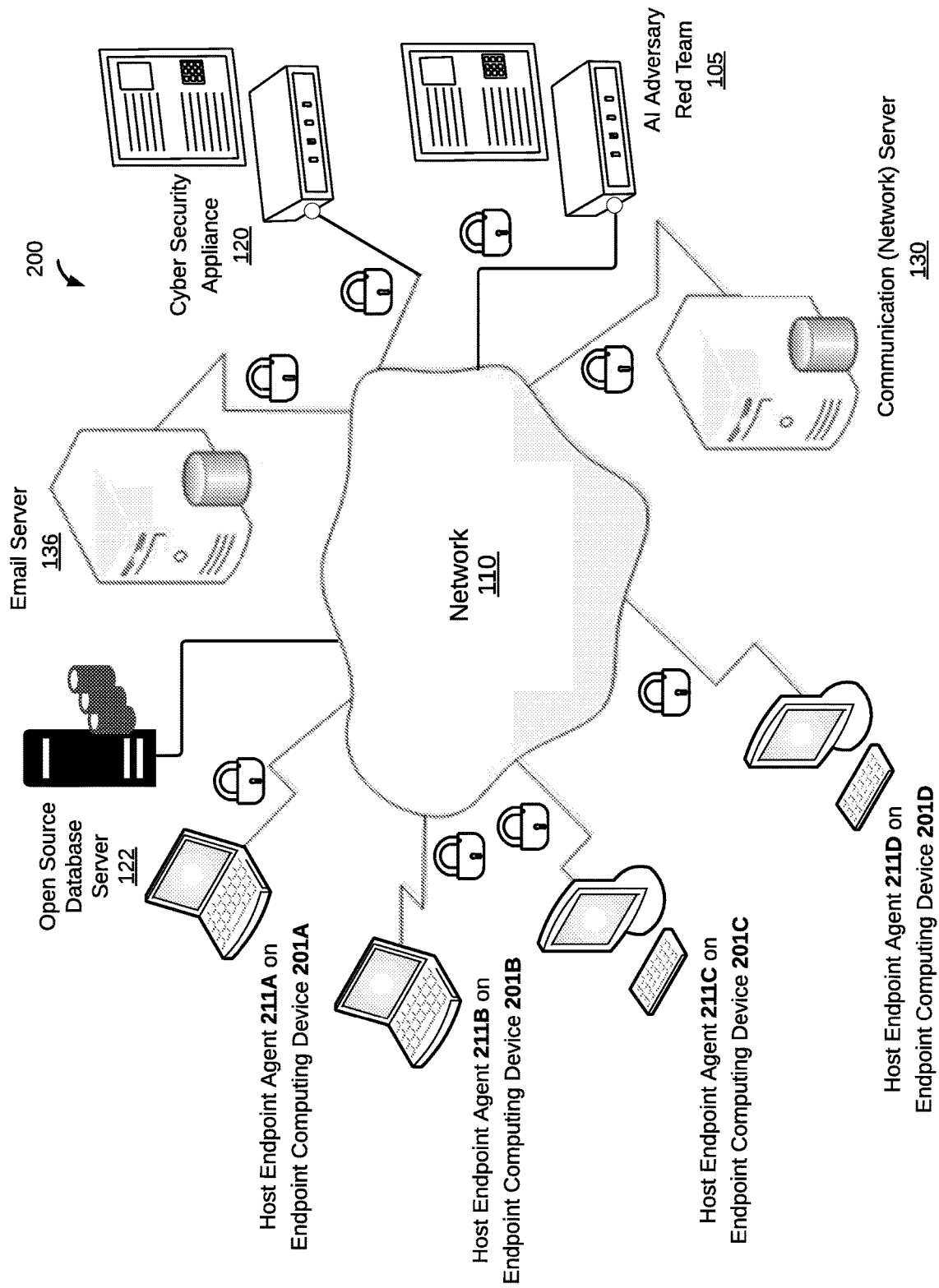
FIG. 2 illustrates an example embodiment of a block diagram of an cyber threat defense system having an AI adversary red team configured to cooperate with a cyber security appliance to pentest a plurality of endpoint computing devices and internal servers that are communicatively coupled to a network.

Referring now to FIG. 2, an AI based cyber threat security system 200 having an AI adversary red team module 105 communicatively coupled over a network 110 with at least one or more of a cyber security appliance 120, host endpoint agents 211A-D, endpoint computing devices 201A-D, and/or entities 122/130/136 is shown, in accordance with an embodiment of the disclosure. Similar to the AI adversary red team module 105 depicted above in FIG. 1, the AI based cyber security system 200 may implement the AI adversary red team module 105 depicted in FIG. 2 to pentest any of the depicted agents 211A-D, devices 201A-D, and/or entities 130/136 via the one or more secure communication channels established with the network 110.

Continuing with FIG. 2, the AI adversary red team module 105 may initiate one or more pentests in the form of software attacks via customized cyber attacks on various entities and users of that organization, which thereby looks for security vulnerabilities, risks, weaknesses, potentially gaining access to the entities' features and data. For example, the cyber threat defense system 200 may use the AI adversary red team module 105 in cooperation with AI modeling and AI classifiers (as described above) to create the automated phishing emails that are tailored to that organization and attack that organization and spoof its entities/users using its own contextual language/information specifically collected for that organization. That is, in most embodiments, the AI adversary red team module 105 generates customized e-mails tailored to include public information known about the company (or organization) in order to generate the customizable and automated spoof/fake phishing emails from another user of that company.

In most embodiments, the AI adversary red team module 105 may be configured to generate all these scenario and simulated attacks that will produce a cyber attack such as a spoofed email from senior employees to subordinates suggesting that the subordinate take a look at the link or attachment (i.e., the first and/or second payloads). In addition, the payloads generated by such AI adversary red team module 105 may include various macro-enabled office documents (or similar delivery mechanisms and attack vectors) attached to such emails, which claim to be key information related to the subject and/or scenario described above.

A translator connector APIs request relevant details from the one or more existing third-party agents/services etc. to feed back through the unifying translator and into the AI adversary red team module.

In these embodiments, the network module of the AI adversary red team module 105 may be used to analyze metrics from these entities (e.g., network entities including servers, networking gateways, routers, each endpoint agent connected to the network) using one or more models. The models may be a self-learning model trained on a normal behavior of each of these entities. The self-learning model of normal behavior is then continuously updated with actual behavior of that entity. The self-learning model of normal behavior is updated when new input data is received that is deemed within the limits of normal behavior. The modules may compare the analyzed metrics received from the probes and hooks to a moving benchmark of parameters that correspond to the normal pattern of life for the computing system used by the self-learning model. Accordingly, the cyber threat module may then determine, in accordance with the analyzed metrics and the moving benchmark used by the self-learning model of normal behavior of the entity, an anomaly score indicative of a likelihood of a harmful cyber threat and its severity.

Note, a normal behavior threshold may be used by the models as a moving benchmark of parameters that correspond to a normal pattern of life for the entities. The normal behavior threshold is varied according to the updated changes in the computer system allowing the model to spot behavior on the computing system that falls outside the parameters set by the moving benchmark.

Again, as described above, any of the host endpoint agents 101A-E may have an autonomous response module that causes one or more autonomous actions to be taken to contain the cyber threat when detected and when: (i) that endpoint agent is not connected to the network 110 where the AI adversary red team module 105 is installed, (ii) the AI adversary red team module 105 is unavailable to communicate with the endpoint agent, and/or (iii) any combination of (i) and/or (ii) occur. The autonomous response module located in the that endpoint agent may take one or more autonomous response actions preapproved by a human user when predefined conditions of suspicious behavior and/or anomaly level are met, independent of the AI adversary red team module 105 to autonomously attempt to contain the potential cyber threat.

Again, the autonomous response module, rather than a human taking an action, may be configured to cause one or more autonomous actions to be taken to contain the cyber threat when a potential cyber threat is detected. It should be understood that, in some embodiments, the AI adversary red team module 105 may have the autonomous response module, and/or one or more portions of the autonomous response module may exist on that host endpoint agent, while the majority portion may remain on the appliance 120 due to greater processing power. A user programmable interface hosted on the appliance 120 having any of fields, menus, and icons may be configured to allow a user to preauthorize the autonomous response module to take actions to contain the cyber threat. The user programmable fields/menus/icons for allowing preauthorization may include, but are not limited to, killing individual processes, revoking specific privileges, preventing the download of specific files, allowing only processes observed in the pattern of life for peer devices to be active for a set period, and asking other EPPs to quarantine suspicious files, etc., while not disturbing operations of other processes going on inside that device.

The user programmable interface has the granularity in options available to the user to program the autonomous response module to take very specific actions such as killing individual processes, revoking specific privileges while still permitting other permissions for that user, getting live terminal access, preventing the download of specific files, allowing only processes observed in the pattern of life for peer devices to be active for a set period, asking other EPPs to quarantine suspicious files, etc. while not shutting down an entire device, or blocking all outside communications, or revoking one or more but not all of that user's privileges. Actions such as revoking only some user privileges or enforcing the peer pattern of life allow the user to continue working but just not perform certain connections or run certain processes, which most likely a malicious piece of software was initiating, such as accessing and downloading sensitive files while the user, completely unaware of the malicious software using their credentials, is doing a normal activity for that user such as typing out a document or entering data into a program.

Example autonomous actions available to be pre-approved by a human user for the autonomous response module may include a general prompt to the user on the display screen of the endpoint computing device along with the action of: (i) prevent or slow down activity related to the threat; (ii) quarantine or semi-quarantine people, processes, devices; and/or (iii) feed threat intelligence to EPP and EDR processes and devices to take third party or vendor specific actions such as quarantine or firewall blocks. Note that, in most embodiments, such actions may be triggered without disrupting the normal day to day activity of users or other processes on that endpoint computing device.

Again, the communications module may send collected pattern of life data to the AI adversary red team module 105 and/or the appliance at periodic intervals when connected to the network 110 where they are installed. The communications module may also send collected pattern of life data to one or more memories of that endpoint computing device (i) when not connected to the network 110, where the AI adversary red team module 105 and the appliance 120 are installed as well as (ii) when the cyber security appliance 120 is unavailable; and (iii) then in either situation, delivers the collected pattern of life data when possible.

Figure 3:
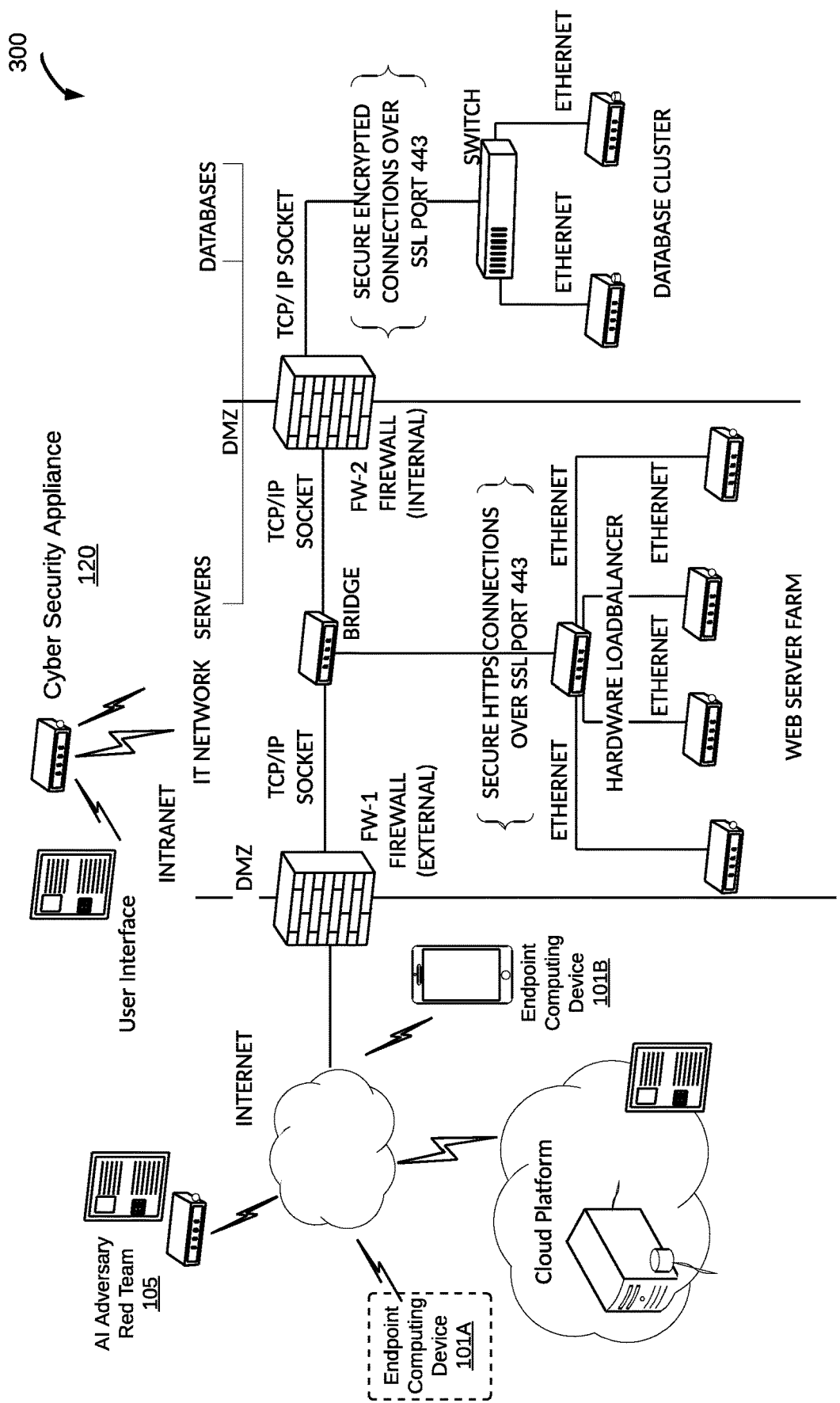
FIG. 3 illustrates an example embodiment of a block diagram of an exemplary AI based cyber security platform having a cyber security appliance configured to protect various network devices and endpoint computing devices communicatively coupled over a network from being pentested by an AI adversary red team.

Referring now to FIG. 3, an AI based cyber security network environment 300 having an AI adversary red team module 105 in cooperation with a cyber security appliance 120 configured to protect endpoint devices 101A-B and various other network devices is shown, in accordance with an embodiment of the disclosure. As shown in FIG. 3, the AI based cyber security network environment 300 may use the AI adversary red team module 105—in cooperation with the cyber security appliance 120 if needed—to use one or more customized phishing emails to pentest any of the endpoint computing devices 101A-B and/or any of the other network entities and devices in this network environment 300 in order to then train and specifically identify any potential vulnerabilities/risks in this environment 300. The AI based cyber security network system 300 depicted in FIG. 3 may be configured similar to the AI cyber threat security systems 100 and 200 depicted in FIGS. 1-2. Some network devices behind the firewalls may not be directly contacted from sources external to the network. As such, in most embodiments, the endpoint devices 101A-B, the AI adversary red team 105, and the cyber security appliance 120 depicted in FIG. 3 may be substantially similar to the endpoint devices 101A-B, the AI adversary red team 105, and the cyber security appliance 120 depicted in FIGS. 1-2.

Figure 4:
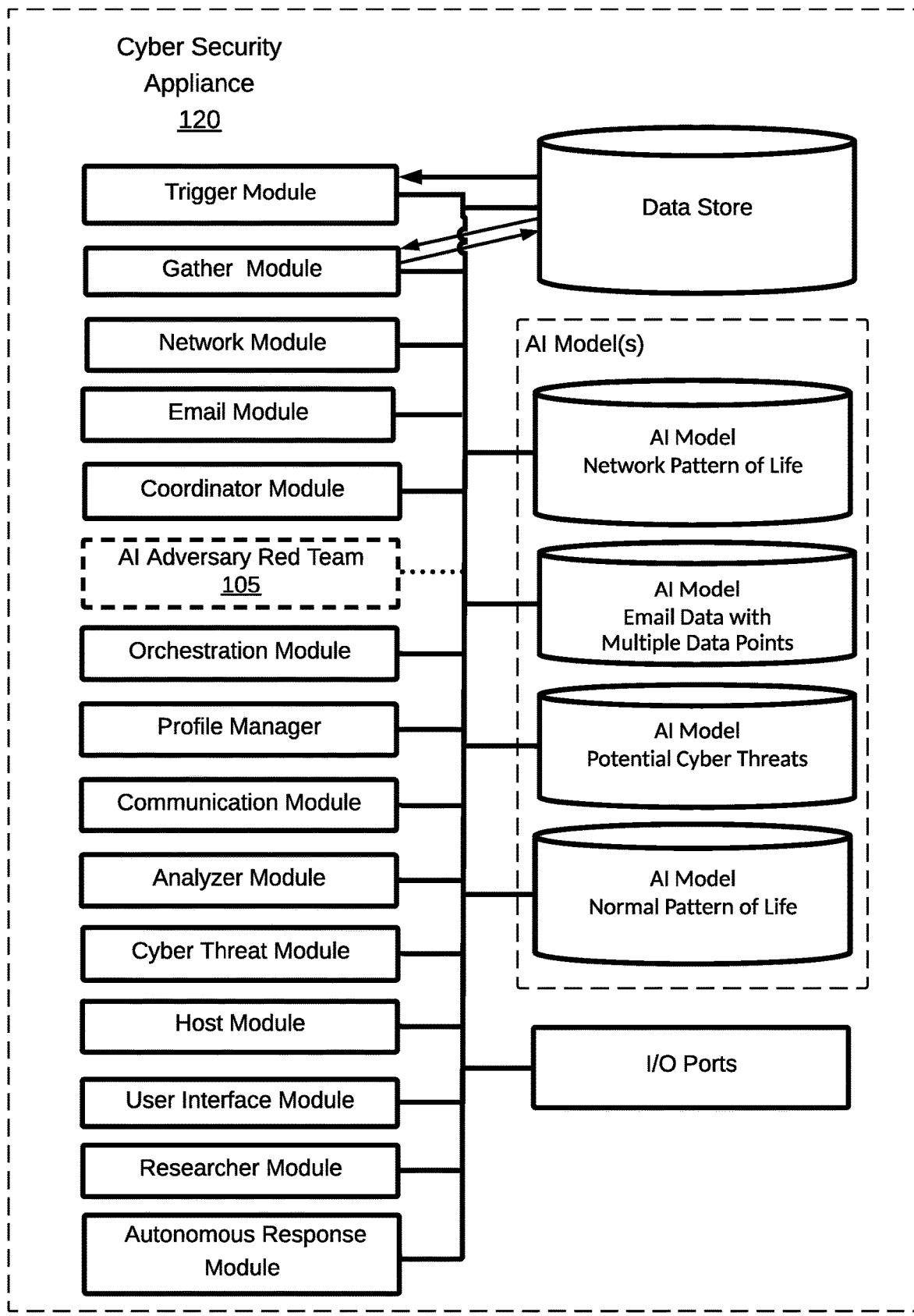
FIG. 4 illustrates an example embodiment of a block diagram of a cyber security appliance with various modules cooperating with various machine learning models trained on the discrete pattern of life of one or more email and network connectivity and behavior pattern data.

Referring now to FIG. 4, a cyber security appliance 120 with various modules cooperating with various AI/machine learning models trained on various observed data points is shown, in accordance with an embodiment of the disclosure. The cyber security appliance 120 may cooperate with the AI adversary red team module 105 depicted in FIG. 1 to protect against cyber security threats from maliciously harming networks as well as from maliciously harming any entities connecting to that network of the organization, where the cyber security appliance 120 is installed, by implementing the AI adversary red team module 105 (and, if needed, in cooperation with the cyber security appliance 120) to use customized phishing emails to pentest any of those connected entities in that network, such that the cyber security appliance 120 and any other defenses are adequately trained on any actual spoofing attacks used to identify all potential risks for that organization and all its entities and users. The cyber security appliance 120 and the AI adversary red team module 105 depicted in FIG. 4 may be substantially similar to the cyber security appliance 120 and the AI adversary red team module 105 depicted above in FIGS. 1-3. As such, in most embodiments, any of the modules, trained AI models, and AI classifiers referenced and discussed in FIG. 4—in reference to the AI adversary red team module 105 in conjunction with the cyber security appliance 120 depicted in FIG. 4—may be substantially similar to any of the modules, trained AI models, and AI classifiers depicted and discussed in FIGS. 1-8.

The cyber security appliance 120 may include components one or more modules, datastores, and/or components, including, but not limited to, a trigger module, a gather module (or a collections module), a data store, a host module, a graphical user interface module, a researcher module, an autonomous response module, at least one input or output (I/O) port to securely connect to other network ports as required, and the AI adversary red team module 105 with any of the cooperating modules described herein.

As noted above, the AI adversary red team module 105 with one or more of cooperating modules in FIG. 4 may be substantially similar to the AI adversary red team module 105 and all of its cooperating modules depicted in FIG. 1.

The AI adversary red team module 105 may use the customized cyber attacks to initiate one or more specific attacks on one or more specific users, and network devices in the network.

Furthermore, the cyber security appliance 120 may include one or more AI and machine learning models such as, but not limited to, a first set of AI models (i.e., the AI model network pattern of life) trained different aspects of the network including users, devices, system activities and interactions between entities in the system, and other aspects of the system; a second set of AI models (i.e., the AI model host pattern of life) trained on pattern of life of host/endpoint computing devices hosting instances of the respective endpoint agents (e.g., trained on the pattern of life pertaining to the endpoint devices 101A-B) including: the users, the multiple software processes, relationships between the software processes, device operation, operating system configuration changes, and other such aspects; a third set of AI models (i.e., the AI model potential cyber threats) trained on any variety of potential cyber threats; and one or more other types of AI models (i.e., the AI model normal pattern of life), each trained on different types of computing devices and operating systems for each type of particular computing device, and other aspects of the systems, as well as other similar components in the cyber security appliance 120. The one or more modules utilize probes to interact with entities in the network (e.g., as described above with the probes depicted in FIG. 3). It should be noted that many of these modules shown in FIG. 4 are substantially similar to the respective modules used in the endpoint devices 101A-B and/or the cyber security appliance 120 described herein in FIGS. 1-8, such that those respective modules may be referenced herein without any limitation.

The trigger module may detect time stamped data indicating one or more events and/or alerts from unusual and/or suspicious behavior/activity that are occurring and may then trigger that something unusual is happening. Accordingly, the gather module may be triggered by specific events and/or alerts of anomalies, such as an abnormal behavior, a suspicious activity, and/or any combination thereof. The inline data may be gathered on the deployment from a data store when the traffic is observed. The scope and wide variation of data available in the data store results in good quality data for analysis. The collected data may be passed to the various modules as well as to the data store.

The gather module (or the collections module) may comprise of multiple automatic data gatherers that each look at different aspects of the data depending on the particular hypothesis formed for the analyzed event and/or alert. The data relevant to each type of possible hypothesis will be automatically pulled from additional external and internal sources. Some data is pulled or retrieved by the gather module for each possible hypothesis from the data store. A feedback loop of cooperation may occur between the gather module and the various modules including, but not limited to, the network module, the host endpoint agent coordinator module, the communications module, the cyber threat module, and/or the researcher module.

In addition, the coordination occurs between the above modules and the one or more AI models trained on different aspects of this process. The cyber threat module may cooperate with the network module and the host endpoint agent coordinator module to identify cyber threats based on analysis and determinations by the analyzer module, the anomaly score module, and such. Each hypothesis of typical cyber threats may have various supporting points of data and other metrics associated with that possible threat, such as a human user insider attack, inappropriate network behavior, inappropriate behavior in a particular endpoint computing device, etc. The AI/machine-learning algorithm may look at the relevant points of data to support or refute that particular hypothesis of what the suspicious activity or abnormal behavior related for each hypothesis on what the suspicious activity or abnormal behavior relates to. Networks may have a wealth of data and metrics that may be collected. The gatherer modules may then filter or condense the mass of data down into the important or salient features of data. In an embodiment, the various modules may be combined or kept as separate modules.

The network module and/or the communications module may receive data on the network from the set of probes. For example, each host endpoint agent 101A-B may communicate and exchanges information with the cyber security appliance 120. The network and/or communications modules may reference any of the various available AI machine learning models. The endpoint agent coordinator module may reference one or more of the AI models, using machine learning and Artificial Intelligence algorithms, that are trained on a normal pattern of life of that endpoint computing device with that host endpoint agent 101A-B. The network module may also reference one or more AI/machine learning models, using machine learning and AI algorithms, that are trained on a normal pattern of life of the network.

A researcher module (or a comparator module) may compare the received data on the network and/or the endpoint devices 101A-B to the normal pattern of life for these individual entities and others in the wider network context in order to detect anomalies and any future potential cyber threats. Note that, once the normal pattern of life has been learned by the models, the network module, the endpoint agent coordinator module, and/or the researcher module may readily identify the anomalies in the normal pattern of life and thus any unusual behaviors from the devices, users, or other aspects of the network and its associated host/endpoint computing devices. Also note that, once the normal pattern of life has been learned by the models, any other modules may be configured to cooperate together to readily identify the anomalies in the normal pattern of life and thus any unusual behaviors from the devices, users, or processes of the network and so on.

The coordinator module may analyze and integrate both activities occurring in the network as well as activities occurring internally within each end-point computing-device at the same time when analyzing the detected anomalies in the normal pattern of life in order to detect the cyber threat. For example, each host endpoint agent may provide pattern of life data to the cyber defense appliance so it may derive pattern of life for each end-point computing-device.

The graphical user interface may display metrics, alerts, and events of both the network in light of activities occurring in endpoint computing device on a common display screen. The graphical user interface allows a viewer to visually contextualize the metrics, alerts, and/or events occurring in the network in light of the activities occurring in the endpoint computing-devices on the common display screen. The graphical user interface also allows a viewer to then to confirm the detected cyber threat in view of what is happening in the network as well as in the endpoint computing devices.

The cyber threat module may compare one or more of the detected anomalies by referencing one or more machine learning models trained on, at least, the cyber threat. Multiple AI/machine learning models may be trained, each model trained on a category of cyber threats and its corresponding members or each model trained on its own specific cyber threat. The cyber threat module cooperates and communicates with the other modules.

The cyber security appliance 120 may supplement the data provided to the users and cyber professionals using a researcher module. The researcher module may use one or more artificial intelligence algorithms to assess whether the anomalous activity has previously appeared in other published threat research or known lists of malicious files or Internet addresses. The researcher module may consult internal threat databases or external public sources of threat data. The researcher module may collect an outside data set describing at least one of an action or a state related to the cyber threat present outside of the network from at least one data source outside the network.

The cyber security appliance 120 may then take actions in response to counter detected potential cyber threats. The autonomous response module, rather than a human taking an action, may be configured to cause one or more rapid autonomous actions in response to be taken to counter the cyber threat. In some embodiments, the user interface for the response module may program the autonomous response module (i) to merely make a suggested response to take to counter the cyber threat that will be presented a display screen and/or sent by a notice to an administrator for explicit authorization when the cyber threat is detected; and/or (ii) to autonomously take a response to counter the cyber threat without a need for a human to approve the response when the cyber threat is detected. The autonomous response module may then send a notice of the autonomous response as well as display the autonomous response taken on the display screen. In an embodiment, the remediation suggester may directly cooperate with the autonomous response module to cause the autonomous response.

The cyber threat module may cooperate with the autonomous response module to cause one or more autonomous actions in response to be taken to counter the cyber threat, improves computing devices in the system by limiting an impact of the cyber threat from consuming unauthorized CPU cycles, memory space, and power consumption in the computing devices via responding to the cyber threat without waiting for some human intervention.

It should be understood that the cyber security appliance 120 may be hosted on any type and number of computing devices, servers, etc., and/or may be configured as its own cyber threat appliance platform, without limitations.

Figure 5:
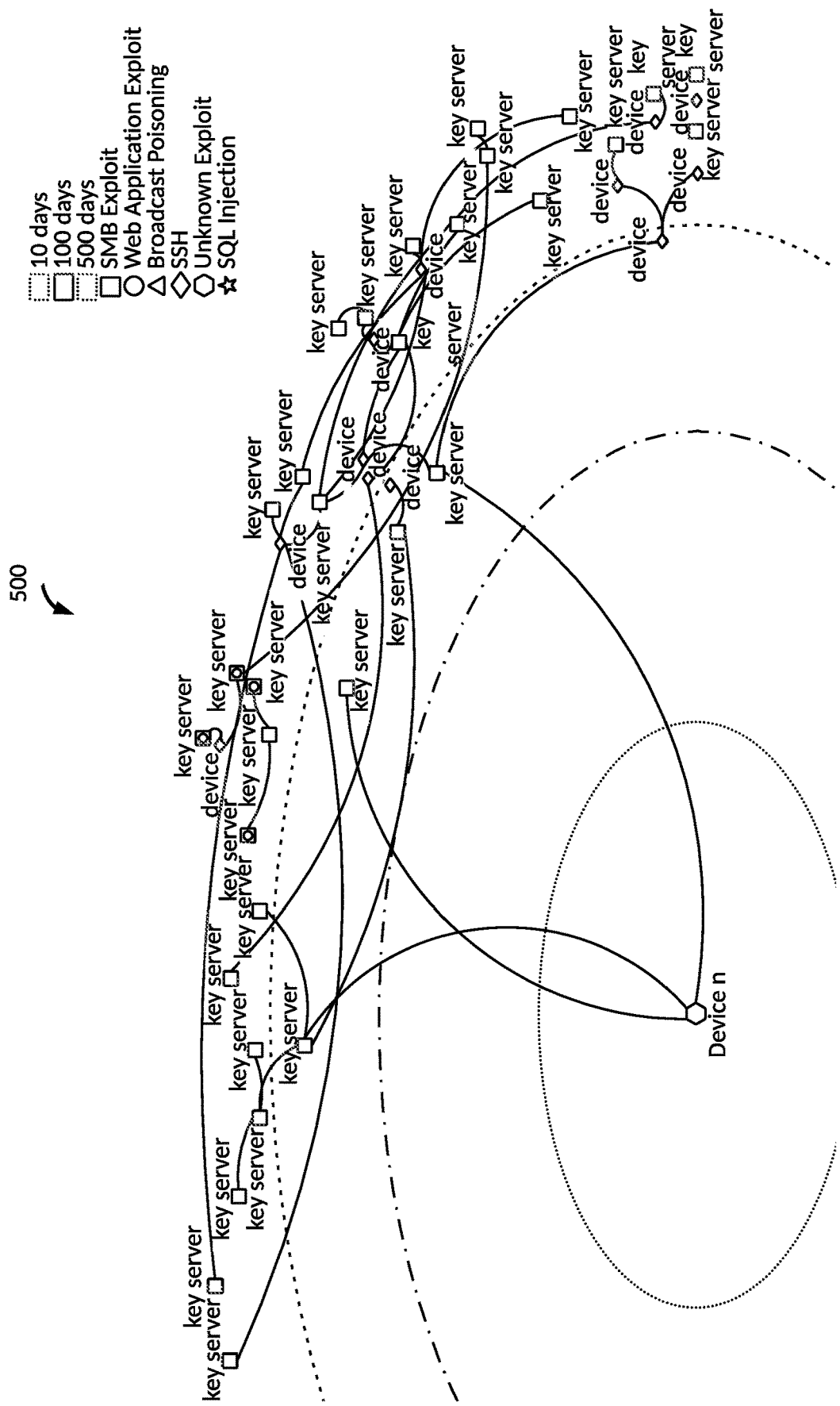
FIG. 5 illustrates an exemplary graph of a generated example of a pentested network in an email/network defense system used to illustrate multiple vulnerabilities of a payload of a customized phishing email being activated by a specific device and spreading in the pentested network.

Referring now to FIG. 5, an exemplary graph 500 of a generated example of a pentested network used to illustrate multiple vulnerabilities and pathways taken by the customized cyber attack being activated by a specific device and spreading routes in the pentested network is shown, in accordance with an embodiment of the disclosure. For example, the graph 500 may be used to illustrate a simulated attack generated and customized by the AI adversary red team in conjunction with trained AI models cooperating with AI classifiers in producing a list of specific organization-based classifiers for those AI classifiers.

As shown in FIG. 5, initially, the customized cyber attack may then be used to initiate a specific attack on a specific user and network device and thus executes on a device "n" (as shown with the focal and initial "Device n" in FIG. 5) in the organization. The cyber attack proceeds through the simulation to show how vulnerable that device "n" and its connected entities are in that defense system. The pentest occurs on all the entities in the network defense system, as shown with the compromised entities in the graph 500. In addition, the simulated cyber-attack module may be used to generate the graph 500 with the cooperation of the trained AI models to deploy that specific attack depicted with the graph 500 in light of the orchestration module, where the specific attack generated by the specific attack scenario may be particularly customized based on email and network connectivity and behavior pattern data of one or more users in the cyber threat defense system as well as the contextual knowledge of the organization and its entities.

In some embodiments, the communications module of the AI adversary red team may be configured to cooperate with the analyzer module and communicate with the profile manager via one or more APIs hosted by the cyber security appliance. As described above, the profile manager module may be used to capture the graph 500, as the profile manager module is configured to maintain all of the profile tags on all of the devices and entities of the organization connecting to that depicted network under analysis. Furthermore, the network module may be used to capture the graph 500, as the network module is particularly used to cooperate with one or more network probes ingesting traffic data of, for example, the depicted network entities, devices, paths, and so on in the depicted network defense system. For example, the AI adversary red team simulator may use the network module cooperating with the email module to cooperate with the profile manager module to maintain the particular profile tags on each of those entities, devices, paths, etc., depicted in FIG. 5. That is, those particular profile tags may be maintained based on their behavior pattern data observed by using the ingested data from the email and/or network modules in conjunction with the trained AI models modelling the normal pattern of life for those entities, devices, paths, etc., depicted in that network defense system in order to obtain those depicted network connectivity and behavioral knowledge and patterns about each of those specific entities, devices, paths, etc., shown with the exemplary graph 500 in FIG. 5.

In other embodiments, the graph 500 may be used to generate an example of that network under analysis used to depict how vulnerable that system in that organization is in regard to the simulated attack being simulated in the simulated cyber-attack scenario module on connections between the depicted entities and devices connected to that initially compromised device "n" in that network. As such, the AI adversary red team simulator may be configured to create the graph of the virtualized network, with its nets and subnets. Each device connecting to the virtualized network is represented as a node in the graph. Two or more of the devices connecting to the virtualized network are assigned with different weighting resistances to malicious compromise from the cyber threat being simulated each of the cyber-attack scenarios during the simulation. As discussed later, some devices will be easier to compromise, and some will be harder to compromise.

For example, the exemplary constructed graph 500 of FIG. 5 may be of a virtualized instance of a network including: i) devices connecting to the virtualized instance of the network as well as ii) connections and pathways through the virtualized starting from a source (reduced to a portion of the graph due to size restrictions of this drawing). The source device 'n' is initially compromised by a cyber threat and the end results of a spread of the compromise in a simulation of an example cyber-attack scenario. The dotted circular lines going out from the source device 'n' represent bands of time, such as a number of days e.g., 10 days, 100 days, etc., before various devices on the network will likely be compromised by a given cyber threat in the example cyber-attack scenario. The AI adversary red team constructs a graph for all devices on each of the subnets in the network that source device 'n' may possibly connect to or get to.

In this example, the AI adversary red team starts off with an assumption that all systems are vulnerable and for each hop in the network, the algorithm seeks the path of least resistance to get closer to the end goal of the cyber-attack scenario while factoring in profile tags of users and devices, restricted subnets, and other defence mechanisms, such as firewalls, antivirus programs based on matching known virus signatures cooperating with the cyber security appliance (e.g., the cyber security appliance 120 in FIG. 1), etc., are used to make corresponding devices less vulnerable to compromise from the cyber threat. All paths may be considered by the AI adversary red team (even an unknown exploit or social engineering exploit that shouldn't be a possible pathway through the network) and then the quickest is sought, rather than searching for known vulnerabilities in the whole network and then plotting a course.

Note that, in some embodiments, an end goal algorithm may be triggered to back track a number of compromised devices to calculate a time duration to taking alternative pathways when the last 'x' number of hops through compromised devices does not significantly get the spread of the cyber-attack closer to achieving the end goal of that cyber-attack scenario. The AI adversary red team may be configured to search and query i) ingested network traffic data as well as ii) analysis on that network traffic data from a data store, from one or more modules, and from one or more AI models within the cyber security appliance. The AI adversary red team has access to and obtains a wealth of actual network data from the network under analysis from, for example, the data store, modules, and the AI models of normal pattern of life for entities in the network under analysis, which means thousands of paths of least resistance through possible routes in this network may be computed during the simulation even when one or more of those possible routes of least resistance that are not previously known or that have not been identified by a human before to determine a spread of the cyber threat from device-to-device.

For example, the network module of the cyber threat defence appliance already maintains a map of historic connectivity between all devices in the network in order to detect 'new' connections as well as model the normal traffic patterns from components connecting to the network, so the AI adversary red team may use this as a map of all possible routes to hop to. The AI adversary red team looks at all known devices that device 'n' has connected to, and the ports and other connection pathways each of these devices used to send traffic or otherwise communicate with each other and devices external to the network, and then calculates the weighting of how difficult it would be to infect/compromise each device. Note the difficulty to compromise a device may be a representation of time taken to infect/compromise a device with the cyber-attack. Difficulty may be calculated based upon the assigned profile tag of the target device. That is, the device with a profile tag of, for example, Windows XP or LLMNR with a human user would have a weighting of 1 (easiest) to transmit to. Note, those devices with profile tags of an anti-virus user or technical user tags would get a slight defence boost which reduces their weighting meaning a longer time to compromise this device.

The AI adversary red team may also look at other factors. The AI adversary red team also identifies recent credentials seen on device 'n' and looks for their use on other devices (as attackers dump credentials from memory on infected devices). The AI adversary red team may take in manual input on restricted subnets and other factors from the user interface window presented to the user. However, as discussed before, by having access to a wealth of network data from the data store and other components inside that the cyber security appliance, then the AI adversary red team may impliedly figure out restricted subnets for each device on the network and pathways unknown to human cyber professionals operating this network. For example, when the historic records show that the device 'n' has never accessed any device in a given subnet, then it is likely device 'n' is restricted from having access to that given subnet. In addition, a likelihood of the compromise of a virtual device being simulated may be tailored and accurate to the corresponding actual device being simulated because the cyber-attack scenario is based upon security credentials and behaviour characteristics from actual traffic data fed to the modules, data store, and AI models of the AI adversary red team (in addition to the cyber security appliance in some embodiments).

Again, some similar concepts and AI training from the mathematical modelling of infectious disease spreading may be applied to cyber threats such as software viruses, malware, insider data theft, and other forms of malicious cyber threats spreading and attacking entities on a network, including key servers. The AI adversary red team may be configured to determine how likely a cyber-attack may spread in a determined amount of time, such as hours, days, etc., to successfully infect/compromise 1) all components, 2) a maximum number of components within a given time duration, 3) 'x' number of key servers, 4) or other end goal selected by default or set by the user on the network. The AI adversary red team may model the spread of a cyber-attack by drawing a graph of a devices connected a subnet and each subnet making up a network and then weighting the graph based upon how likely it would be for the cyber-attack to spread. Also, the AI adversary red team may be configured to determine how severe it is when a particular component that the malicious cyber threats spread to, is infected.

The AI adversary red team may be configured to use these AI models initially trained on spread of the disease (e.g., the spread of the activated payload attached to the customized phishing email in the email and network defense systems), which are then retrained on the spread of malicious cyber threats through different devices on a network. Machine learning can repurpose graph theory analysis from other applications such as epidemiology to the lateral movement of an attacker through a network. The re-training combines i) knowledge of cyber threats, ii) knowledge of 1) security features and credentials, and 2) characteristics of network devices, and iii) other network specific information, such as information technology network information, email network information, SaaS environment information, Cloud information, etc., and iii) previous concepts and training from the mathematical AI modelling of infectious diseases to analyse network systems (e.g., email, IT network, SaaS, cloud, industrial networks, etc.) under analysis and make targeted predictions as well as provide validation of theoretical scenarios and attacks via the one or more modules of the AI adversary red team, which is then depicted as a simulated and detailed graph (such as the graph 500) and then provided to the organization as a detailed generated and formatted report.

In other examples, one or more modules may be configured to search and query: generally all of, but at least two or more of i) data stores (e.g., public OS data, ingested data observed by any cyber security appliances, and so on), ii) other modules, and iii) one or more AI models and classifiers making up such AI red team simulator used to pentest and then train and identify any vulnerabilities of the actual network under analysis from any actual cyber threats, based on what those searched and queried data stores, other modules/appliances/probes, etc., and AI models already know about that network and those entities under analysis to generate the simulated graph. For example, the graph of the virtualize instance of the network may be created with generally all of, but at least two or more of: 1) known characteristics of the network itself, 2) pathway connections between devices on that network, 3) security features and credentials of devices and/or their associated users, and 4) behavioural characteristics of the devices and/or their associated users connecting to that network, which all of this information is obtained from what was already know about the network from the AI adversary red team, the cyber security appliance, and/or any other similar devices.

In one example, the AI adversary red team may be configured to create the actual version of that network and its network devices based on the organization's user input to make sure that no major entities are degraded or compromised in that actual network under analysis when running the simulation (e.g., a vulnerability test). The network, and its network components connecting to that network, being tested during the simulation may thus be up to date and accurate for a time the actual network under analysis is being tested and simulated because the AI adversary red team is configured to obtain actual network data collected by its one or more cooperating modules (as described above). The AI adversary red team may be configured to simulate the compromise of a spread of the cyber threat being simulated in the simulated cyber-attack scenario on connections between the devices connected to the network. During this, the AI adversary red team may be configured to then perform one or more calculations on an ease of transmission of the cyber threat between those devices, including key network devices, on a hop between those devices.

Lastly, as noted above, the AI adversary red team may be configured to construct the graph of the simulated version of the attack on that actual network from collected data and knowledge known and stored by the respective modules, data stores, and AI models and classifiers. Note that the knowledge known and stored by the email and network modules may be obtained at least from the ingested traffic from the email and/or network probes in the actual network under analysis. This information may be needed when the AI adversary red team is configured to create one or more scenarios for specific attacks using, for example, one or more models of one or more hypothetical compromises by the hypothetical cyber threat through one or more virtualized versions of that network based upon how likely it would be for such cyber-attacks to spread to achieve either of: (1) a programmable end goal of that cyber-attack scenario set by a user, and/or (2) a programmable end goal of that cyber-attack scenario set by one or more default end goals scripted into such cyber-attack scenarios, such as an end goal of compromising the most amount of possible entities in that defense system used for that organization. In an embodiment, a source device, such as the device "n", may be the initial carrier of the compromise/activation (e.g., unwanted and/or unauthorized access by a malicious payload and/or the like) that will spread down the path of least resistance in the network to achieve a purpose of that cyber-attack, which, by default, is to compromise the greatest number of possible entities in that network of that system for that organization. Other cyber-attack scenarios may have an end goal to target specific devices associated with compromising specific users, such as finance or human resources, and/or compromising specific key servers deep within the network behind multiple layers of network security, and in both cases may not want to compromise as many devices as possible but compromise limited devices in a pathway to the target goal of the cyber-attack scenario in order to avoid accidental detection before reaching the specific target of the attack scenario.

Figure 6:
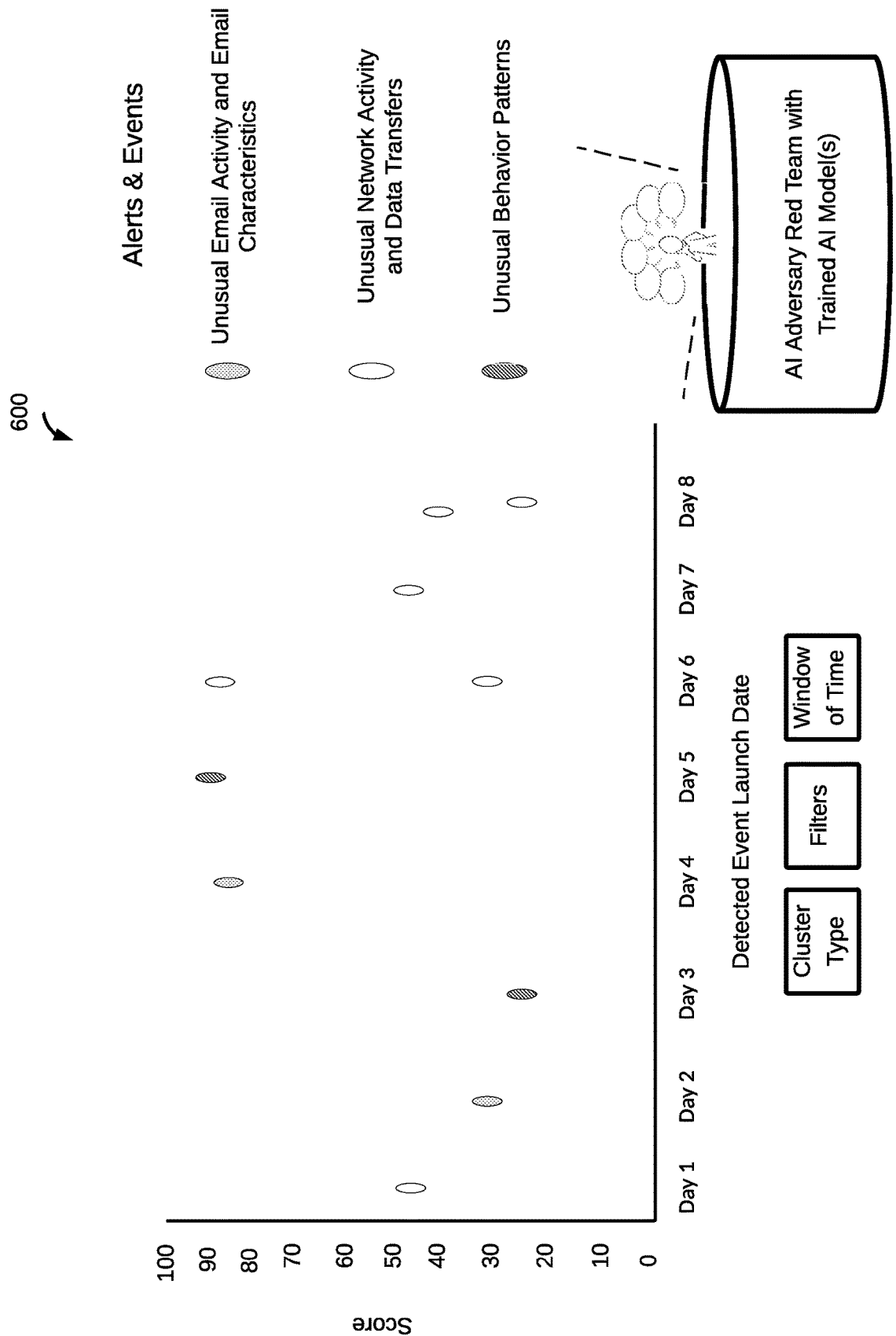
FIG. 6 illustrates an example embodiment of a block diagram of a graph depicting one or more events and alerts triggered by any detected unusual email and network connectivity and behaviour patterns.

Referring now to FIG. 6, an exemplary graph 600 for depicting events and alerts triggered by various detected unusual email and network connectivity and behaviour pattern data in relation to their cyber-threat scores and detected event launch times is shown, in accordance with an embodiment of the disclosure. The graph 600 may depict a cluster of unusual behaviors detected and analyzed in an AI cyber security platform, where the cluster of detected unusual behaviors may include, but are not limited to, any detected unusual payload activations based on any email and network activity and/or data transfers as well as any other unusual behavior patterns. For example, the graph 600 may depict one or more different machine learning models (as described above) that are trained to analyze any detected unusual behavior patterns from the collected pattern of life data against the normal pattern of life from any collected data from any of the entities in the organization.

In some embodiments, the graph 600 may be provided on a user interface used to show a user the cluster of alerts and/or events associated with the variety of detected unusual email/network activity, data transfers, and behavior patterns, which may further include the respective detailed labels of the characteristics of such detected alerts and/or events.

The cyber defence system uses unusual behaviour deviating from the normal behaviour and then builds a sequence of unusual behaviour and the causal links between that sequence of unusual behaviour to detect cyber threats as shown with the graph 600 in FIG. 6. In additional embodiments, the unusual patterns may be determined by analyzing what activities/events/alerts that fall outside of the window of what is the normal pattern of life for that network/system/device/user under analysis to determine whether that pattern is indicative of a behaviour of a malicious actor—human, program, or other threat. Next, the cyber defence system can go back and pull in some of the normal activities to help support or refute a possible hypothesis of whether that pattern is indicative of a behaviour of a malicious actor. The analyser module can cooperate with one or more models trained on cyber threats and their behaviour to try to determine if a potential cyber threat is causing these unusual behaviours. If the pattern of behaviours under analysis is believed to be indicative of a malicious actor, then a score of how confident is the system in this assessment of identifying whether the unusual pattern was caused by a malicious actor is created. Next, also assigned is a threat level score or probability indicative of what level of threat does this malicious actor pose. Lastly, the cyber defence system is configurable in a user interface, by a user, enabling what type of automatic response actions, if any, the cyber defence system may take when different types of cyber threats, indicated by the pattern of behaviours under analysis, that are equal to or above a configurable level of threat posed by this malicious actor.

The AI models may perform by the threat detection through a probabilistic change in a normal behaviour through the application of an unsupervised Bayesian mathematical model to detect behavioural change in computers and computer networks. The core threat detection system is termed the 'Bayesian probabilistic'. The 'Bayesian probabilistic' approach can determine periodicity in multiple time series data and identify changes across single and multiple time series data for the purpose of anomalous behaviour detection. From the email and potentially IT network raw sources of data, a large number of metrics can be derived each producing time series data for the given metric.

The detectors in the analyser module including its network module (simulator can get extract meta data from network module) and email module components can be discrete mathematical models that implement a specific mathematical method against different sets of variables with the target. Thus, each model is specifically targeted on the pattern of life of alerts and/or events coming from, for example, i) that cyber security analysis tool analysing various aspects of the emails, iii) coming from specific devices and/or users within a system, etc. At its core, the AI adversary red team as well as the cyber security appliance may mathematically characterize what constitutes 'normal' behaviour in line with the normal pattern of life for that entity and organization based on the analysis of a large number/set of different measures of a device's network behaviour. Such red team and appliance can build a sophisticated 'pattern of life'—that understands what represents normality for every person, device, entity, email activity, and network activity in the system being protected by the cyber threat defense system. For example, the analyzer module may rank supported candidate cyber threat hypotheses by a combo of likelihood that this candidate cyber threat hypothesis is supported and a severity threat level of this incident type.

In addition, the correlation of the reporting and formatting modules may be configured to generate the report (or the graphs) with the identified critical devices connecting to the virtualized instance of the network under analysis that should have the priority to allocate security resources to them, along with one or more portions of the constructed graph. The formatting module may have an autonomous email-report composer that cooperates with the various AI models and modules of the AI adversary red team and the remediation suggester module as well as at least a set of one or more libraries of sets of contextual text, objects, and visual representations to populate on templates of pages in the email threat report based on any of the training and/or simulated attacking scenarios observed. The autonomous email-report composer can compose a threat report on cyber threats that is composed in a human-readable format with natural language prose, terminology, and level of detail on the cyber threats aimed at a target audience being able to understand the terminology and the detail. Such modules and AI models may cooperate with the autonomous report composer to indicate in the threat report, for example, an email attack's purpose and/or targeted group (such as members of the finance team, or high-level employees).

The formatting module may format, present a rank for, and output the current threat report, from a template of a plurality of report templates, that is outputted for a human user's consumption in a medium of, any of 1) a printable report, 2) presented digitally on a user interface, 3) in a machine readable format for further use in machine-learning reinforcement and refinement, and 4) any combination of the three.

The system may use at least three separate machine learning models or any particular number of separate AI machine learning models. For example, a machine learning model may be trained on specific aspects of the normal pattern of life for entities in the system, such as devices, users, email/network traffic flow, outputs from one or more cyber security analysis tools analysing the system, etc. One or more machine learning models may also be trained on characteristics and aspects of all manner of types of cyber threats. One or more machine learning models may also be trained on composing threat reports.

The various modules cooperate with each other, the AI models, and the data store to carry out the operations discussed above with regard to the AI adversary red team. Such modules may cooperate to improve the analysis of the how vulnerable the organization is based on any of the observed (or trained/simulated/pentested) unusual events are to that specific organization and thus improve the formalized report generation with specific vulnerabilities and the extend of those vulnerabilities with less repetition to consume less CPU cycles, as well as doing this more efficiently and effectively than humans. For example, the modules can repetitively go through these steps and re-duplicate steps to filter and rank the one or more supported possible cyber threat hypotheses from the possible set of cyber threat hypotheses and/or compose the detailed information to populate into the email threat report. Note that, one or more processing units are configured to execute software instructions associated with the AI adversary red team and any of its cooperating modules in that depicted system. Also note, that one or more non-transitory storage mediums are configured to store at least software associated with the AI adversary red team simulator/apparatus, the other modules, and the AI models and classifiers.

Referring now to FIG. 7, an exemplary AI cyber threat defense system 700 having the AI adversary red team module 105 and a cyber threat security appliance 120 protecting a network 110, a database server 730, and one or more computing devices 710 and 740 is shown, in accordance with an embodiment of the disclosure. The AI cyber threat defense system 700 depicted in FIG. 7 may be similar to the cyber threat defense systems 100 and 200 depicted above in FIGS. 1-8. For example, the AI cyber threat defense system 700 may configure the AI adversary red team module 105 (and/or the cyber security appliance 120) to pentest the computing devices 710 and 740 communicatively coupled over the network 110.

The computers may implement the various AI models and other modules discussed herein. For example, computer 701 may build and maintain a dynamic, ever-changing model of the 'normal behavior' of each user and machine within the system 710. The approach is based on Bayesian mathematics, and monitors all interactions, events and communications within the system 710—which computer is talking to which, files that have been created, networks that are being accessed, and so on.

For example, the computer 702 may be based in a company's San Francisco office and operated by a marketing employee who regularly accesses the marketing network, usually communicates with machines in the company's U.K. office in second computer system 740 between 9:30 AM and midday and is active from about 8:30 AM until 6 PM. The same employee virtually never accesses the employee time sheets, very rarely connects to the company's Atlanta network and has no dealings in South-East Asia. The AI based cyber threat detection system takes all the information that is available relating to this employee and establishes a 'pattern of life' for that person, which is dynamically updated as more information is gathered. The 'normal' model is used as a moving benchmark, allowing the system to spot behavior on a system that seems to fall outside of this normal pattern of life, and flags this behavior as anomalous, requiring further investigation.

The AI adversary red team apparatus/simulator may be built to deal with the fact that today's attackers are getting stealthier and an attacker may be 'hiding' in a system to ensure that they avoid raising suspicion in an end user, such as by slowing their machine down, using normal software protocol. Any attack process thus stops or 'backs off' automatically if the mouse or keyboard is used. However, yet more sophisticated attacks try the opposite, hiding in memory under the guise of a normal process and stealing CPU cycles only when the machine is active, in an attempt to defeat a relatively-simple policing process. These sophisticated attackers look for activity that is not directly associated with the user's input. As an APT (Advanced Persistent Threat) attack typically has very long mission windows of weeks, months or years, such processor cycles may be stolen so infrequently that they do not impact machine performance. But however cloaked and sophisticated the attack is, there will always be a measurable delta, even if extremely slight, in typical machine behavior, between pre and post compromise. This behavioral delta may be observed and acted on with the form of Bayesian mathematical analysis used by the AI based cyber threat security detection system installed on the computer 701.

The AI based cyber threat security/defense self-learning platform may use machine-learning technology with the AI adversary red team. The machine-learning technology, using advanced mathematics, may detect previously unidentified threats, without rules, and automatically defend networks. Note, today's attacks may be of such severity and speed that a human response may not happen quickly enough. Thanks to these self-learning advances, it is now possible for a machine to uncover emerging threats and deploy appropriate, real-time responses to fight back against the most serious cyber threats.

This cyber threat defense system with the AI adversary red team may therefore be built and trained to have a sophisticated 'pattern of life'—that understands what represents normality for every person, device, and network activity associated with any of the users and/or entities in such system being protected by such AI cyber threat security system.

The cyber threat defense system with the AI adversary red team may have the ability to self-learn and detect normality in order to spot true anomalies, allowing organizations of all sizes to understand any unusual behaviors of users, machines, tokens (or symbols, process chains, etc.), and so on, observed within any respective and discrete host device(s) and network(s) at both an individual and group level. Monitoring behaviors, rather than using predefined descriptive objects and/or signatures, means that more attacks may be spotted ahead of time and extremely subtle indicators of wrongdoing may be detected. Unlike traditional legacy defenses, a specific attack type or new malware does not have to have been seen first before it may be detected. A behavioral defense approach mathematically models both machine and human activity behaviorally, at and after the point of compromise, in order to predict and catch today's increasingly sophisticated cyber-attack vectors. It is thus possible to computationally establish what is normal, in order to then detect what is abnormal.

This cyber threat defense system with the AI adversary red team may thus be capable of making value judgments and carrying out higher value, more thoughtful tasks. Machine learning requires complex algorithms to be devised and an overarching framework to interpret the results produced. However, when applied correctly these approaches may facilitate machines to make logical, probability-based decisions and undertake thoughtful tasks.

Advanced machine-learning is at the forefront of the fight against automated and human-driven cyber-threats, overcoming the limitations of rules and signature-based approaches: (i) The machine-learning learns what is normal within a network—it does not depend upon knowledge of previous attacks. (ii) The machine-learning thrives on the scale, complexity and diversity of modern businesses, where every device and person is slightly different. (iii) The machine-learning turns the innovation of attackers against them—any unusual activity is visible. (iv) The machine-learning constantly revisits assumptions about behavior, using probabilistic mathematics. (v) The machine-learning is always up to date and not reliant on human input.

Utilizing machine-learning in cyber security technology is difficult, but when correctly implemented it is extremely powerful. The machine-learning means that previously unidentified threats may be detected, even when their manifestations fail to trigger any rule set or signature. Instead, machine-learning allows the system to analyze large sets of data and learn a 'pattern of life' for what it sees. Machine learning may approximate some human capabilities to machines, such as: (i) thought: it uses past information and insights to form its judgments; (ii) real time: the system processes information as it goes; and (iii) self-improving: the model's machine-learning understanding is constantly being challenged and adapted, based on new information. New unsupervised machine-learning therefore allows computers to recognize evolving threats, without prior warning or supervision.

Note that, in other embodiments, one or more other detectors and data analysis process may be employed as detailed below, without limitations.

Unsupervised Machine Learning

Unsupervised learning works things out without pre-defined labels. In the case of sorting the series of different animals, the system analyzes the information and works out the different classes of animals. This allows the system to handle the unexpected and embrace uncertainty. The system does not always know what it is looking for, but may independently classify data and detect compelling patterns.

The cyber threat defense system's unsupervised machine learning methods do not require training data with pre-defined labels. Instead, they are able to identify key patterns and trends in the data, without the need for human input. The advantage of unsupervised learning is that it allows computers to go beyond what their programmers already know and discover previously unknown relationships.

The cyber threat defense system uses unique implementations of unsupervised machine learning algorithms to analyze network data at scale, intelligently handle the unexpected, and embrace uncertainty. Instead of relying on knowledge of past threats to be able to know what to look for, it is able to independently classify data and detect compelling patterns that define what may be considered to be normal behavior. Any new behaviors that deviate from those, which constitute this notion of 'normality,' may indicate threat or compromise. The impact of the cyber threat defense system's unsupervised machine learning on cyber security is transformative: (i) Threats from within, which would otherwise go undetected, may be spotted, highlighted, contextually prioritized and isolated using these algorithms. (ii) The application of machine learning has the potential to provide total network visibility and far greater detection levels, ensuring that networks have an internal defense mechanism. (iii) Machine learning has the capability to learn when to action automatic responses against the most serious cyber threats, disrupting in progress attacks before they become a crisis for the organization.

This new mathematics not only identifies meaningful relationships within data, but also quantifies the uncertainty associated with such inference. By knowing and understanding this uncertainty, it becomes possible to bring together many results within a consistent framework—the basis of Bayesian probabilistic analysis. The mathematics behind machine learning is extremely complex and difficult to get right. Robust, dependable algorithms are developed, with a scalability that enables their successful application to real-world environments.

Overview

In an embodiment, a closer look at the cyber threat defense system's machine learning algorithms and approaches is as follows.

The cyber threat defense system's probabilistic approach to cyber security is based on a Bayesian framework. This allows it to integrate a huge number of weak indicators of potentially anomalous network behavior to produce a single clear measure of how likely a network device is to be compromised. This probabilistic mathematical approach provides an ability to understand important information, amid the noise of the network—even when it does not know what it is looking for.

Ranking Threats

Crucially, the cyber threat defense system's approach accounts for the inevitable ambiguities that exist in data and distinguishes between the subtly differing levels of evidence that different pieces of data may contain. Instead of generating the simple binary outputs 'malicious' or 'benign,' the cyber threat defense system's mathematical algorithms produce outputs that indicate differing degrees of potential compromise. This output enables users of the system to rank different alerts in a rigorous manner and prioritize those that most urgently require action, simultaneously removing the problem of numerous false positives associated with a rule-based approach.

At its core, the cyber threat defense system mathematically characterizes what constitutes 'normal' behavior based on the analysis of a large number/set of different measures of a devices network behavior, examples include at least one or more of: server access; data access; timings of events; credential use; DNS requests; and/or any other similar parameters. Each measure of network behavior is then monitored in real time to detect anomalous behaviors.

Clustering

To be able to properly model what should be considered as normal for a device, its behavior must be analyzed in the context of other similar devices on the network. To accomplish this, the cyber threat defense system leverages the power of unsupervised learning to algorithmically identify naturally occurring groupings of devices, a task which is impossible to do manually on even modestly sized networks.

In order to achieve as holistic a view of the relationships within the network as possible, the cyber threat defense system simultaneously employs a number of different clustering methods including matrix based clustering, density based clustering and hierarchical clustering techniques. The resulting clusters are then used to inform the modeling of the normative behaviors of individual devices. At a glance, clustering: (i) Analyzes behavior in the context of other similar devices on the network; (ii) Algorithms identify naturally occurring groupings of devices—impossible to do manually; and (iii) Simultaneously runs a number of different clustering methods to inform the models.

Network Topology

Any cyber threat detection system must also recognize that a network is far more than the sum of its individual parts, with much of its meaning contained in the relationships among its different entities, and that complex threats may often induce subtle changes in this network structure. To capture such threats, the cyber threat defense system employs several different mathematical methods in order to be able to model multiple facets of a networks topology.

One approach is based on iterative matrix methods that reveal important connectivity structures within the network. In tandem with these, the cyber threat defense system has developed innovative applications of models from the field of statistical physics, which allow the modeling of a network's 'energy landscape' to reveal anomalous substructures that may be concealed within.

Network Structure

A further important challenge in modeling the behaviors of network devices, as well as of networks themselves, is the high-dimensional structure of the problem with the existence of a huge number of potential predictor variables. Observing packet traffic and host activity within an enterprise LAN, WAN and Cloud is difficult because both input and output may contain many inter-related features (protocols, source and destination machines, log changes and rule triggers, etc.). Learning a sparse and consistent structured predictive function is crucial to avoid the curse of over fitting.

In this context, the cyber threat defense system has employed a cutting edge large-scale computational approach to learn sparse structure in models of network behavior and connectivity based on applying L1-regularization techniques (e.g. a lasso method). This allows for the discovery of true associations between different network components and events that may be cast as efficiently solvable convex optimization problems and yield parsimonious models.

Recursive Bayesian Estimation

To combine these multiple analyses of different measures of network behavior to generate a single comprehensive picture of the state of each device, the cyber threat defense system takes advantage of the power of Recursive Bayesian Estimation (RBE) via an implementation of the Bayes filter.

Using RBE, the cyber threat defense system's mathematical models are able to constantly adapt themselves, in a computationally efficient manner, as new information becomes available to the system. They continually recalculate threat levels in the light of new evidence, identifying changing attack behaviors where conventional signature-based methods fall down.

The cyber threat defense system's innovative approach to cyber security has pioneered the use of Bayesian methods for tracking changing device behaviors and computer network structures. The core of the cyber threat defense system's mathematical modeling is the determination of normative behavior, enabled by a sophisticated software platform that allows for its mathematical models to be applied to new network data in real time. The result is a system that is able to identify subtle variations in machine events within a computer networks behavioral history that may indicate cyber-threat or compromise.

The cyber threat defense system uses mathematical analysis and machine learning to detect potential threats, allowing the system to stay ahead of evolving risks. The cyber threat defense system approach means that detection no longer depends on an archive of previous attacks. Instead, attacks may be spotted against the background understanding of what represents normality within a network. No pre-definitions are needed, which allows for the best possible insight and defense against today's threats. On top of the detection capability, the cyber threat defense system may create digital antibodies automatically, as an immediate response to the most threatening cyber breaches. The cyber threat defense system approach both detects and defends against cyber threat. Genuine unsupervised machine learning eliminates the dependence on signature-based approaches to cyber security, which are not working. The cyber threat defense system's technology may become a vital tool for security teams attempting to understand the scale of their network, observe levels of activity, and detect areas of potential weakness. These no longer need to be manually sought out, but are flagged by the automated system and ranked in terms of their significance.

The threat detection system that has been discussed above therefore implements a propriety form of recursive Bayesian estimation to maintain a distribution over the probability state variable. This distribution is built from the complex set of low-level host, network and traffic observations or 'features'. These features are recorded iteratively and processed in real time on the platform. A plausible representation of the relational information among entities in dynamic systems in general, such as an enterprise network, a living cell or a social community, or indeed the entire internet, is a stochastic network, which is topological rewiring and semantically evolving over time. In many high-dimensional structured I/O problems, such as the observation of packet traffic and host activity within a distributed digital enterprise, where both input and output may contain tens of thousands, sometimes even millions of interrelated features (data transport, host-web-client dialogue, log change and rule trigger, etc.), learning a sparse and consistent structured predictive function is challenged by a lack of normal distribution. To overcome this, the threat detection system consists of a data structure that decides on a rolling continuum rather than a stepwise method in which recurring time cycles such as the working day, shift patterns and other routines are dynamically assigned. Thus, providing a non-frequentist architecture for inferring and testing causal links between explanatory variables, observations and feature sets. This permits an efficiently solvable convex optimization problem and yield parsimonious models. In such an arrangement, the threat detection processing may be triggered by the input of new data. Alternatively, the threat detection processing may be triggered by the absence of expected data. In some arrangements, the processing may be triggered by the presence of a particular actionable event.

The method and system are arranged to be performed by one or more processing components with any portions of software stored in an executable format on a computer readable medium. The computer readable medium may be non-transitory and does not include radio or other carrier waves. The computer readable medium could be, for example, a physical computer readable medium such as semiconductor or solid state memory, magnetic tape, a removable computer diskette, a random access memory (RAM), a read-only memory (ROM), a rigid magnetic disc, and an optical disk, such as a CD-ROM, CD-R/W or DVD.

The various methods described above may be implemented by a computer program product. The computer program product may include computer code arranged to instruct a computer to perform the functions of one or more of the various methods described above. The computer program and/or the code for performing such methods may be provided to an apparatus, such as a computer, on a computer readable medium or computer program product. For the computer program product, a transitory computer readable medium may include radio or other carrier waves.

An apparatus such as a computer may be configured in accordance with such code to perform one or more processes in accordance with the various methods discussed herein.

Computing Systems

A computing system may be, wholly or partially, part of one or more of the server or client computing devices in accordance with some embodiments. Components of the computing system may include, but are not limited to, a processing unit having one or more processing cores, a system memory, and a system bus that couples various system components including the system memory to the processing unit.

The computing system typically includes a variety of computing machine-readable media. Computing machine-readable media may be any available media that may be accessed by computing system and includes both volatile and nonvolatile media, and removable and non-removable media.

The system memory includes computer storage media in the form of volatile and/or nonvolatile memory such as read only memory (ROM) and random access memory (RAM). A basic input/output system (BIOS) containing the basic routines that help to transfer information between elements within the computing system, such as during start-up, is typically stored in ROM. RAM typically contains data and/or software that are immediately accessible to and/or presently being operated on by the processing unit. By way of example, and not limitation, the RAM may include a portion of the operating system, application programs, other executable software, and program data.

The drives and their associated computer storage media discussed above, provide storage of computer readable instructions, data structures, other executable software and other data for the computing system.

A user may enter commands and information into the computing system through input devices such as a keyboard, touchscreen, or software or hardware input buttons, a microphone, a pointing device and/or scrolling input component, such as a mouse, trackball or touch pad. The microphone may cooperate with speech recognition software. A display monitor or other type of display screen device is also connected to the system bus via an interface, such as a display interface. In addition to the monitor, computing devices may also include other peripheral output devices such as speakers, a vibrator, lights, and other output devices, which may be connected through an output peripheral interface.

The computing system may operate in a networked environment using logical connections to one or more remote computers/client devices, such as a remote computing system. The logical connections may include a personal area network ("PAN") (e.g., Bluetooth®), a local area network ("LAN") (e.g., Wi-Fi), and a wide area network ("WAN") (e.g., cellular network), but may also include other networks. Such networking environments are commonplace in offices, enterprise-wide computer networks, intranets and the Internet. A browser application or direct app corresponding with a cloud platform may be resident on the computing device and stored in the memory.

It should be noted that the present design may be carried out on a single computing system and/or on a distributed system in which different portions of the present design are carried out on different parts of the distributed computing system.

Note, software may include applications, mobile apps, and programs as well as an operating system application. Some portions of this description are presented in terms of algorithms and symbolic representations of operations on data bits within a computer memory. These algorithmic descriptions and representations are the means used by those skilled in the data processing arts to most effectively convey the substance of their work to others skilled in the art. These algorithms may be written in a number of different software programming languages such as Python, C, C++, or other similar languages. Also, an algorithm may be implemented with lines of code in software, configured logic gates in software, or a combination of both. In an embodiment, the logic consists of electronic circuits that follow the rules of Boolean Logic, software that contain patterns of instructions, or any combination of both. A module can be implemented with electronic circuits, software stored in a memory and executed by a processor component, and combinations of both.

It should be borne in mind, however, that all of these and similar terms are to be associated with the appropriate physical quantities and are merely convenient labels applied to these quantities. Unless specifically stated otherwise as apparent from the above discussions, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers, or other such information storage, transmission or display devices.

While the foregoing design and embodiments thereof have been provided in considerable detail, it is not the intention of the applicant(s) for the design and embodiments provided herein to be limiting. Additional adaptations and/or modifications are possible, and, in broader aspects, these adaptations and/or modifications are also encompassed. Accordingly, departures may be made from the foregoing design and embodiments without departing from the scope afforded by the following claims, which scope is only limited by the claims when appropriately construed.

What is claimed is:

1. An apparatus, comprising:
   one or more processor components; and
   a non-transitory computer readable medium including software that is executable by the one or more processor components, the software comprises
     a node exposure score generator configured to a) compute, via a mathematical function, a network node's exposure to a cyber threat that originates external to a network and b) supply the network node's exposure into an attack path modeling component, where each network node's exposure to the cyber threat is based on at least actual vulnerabilities that are detected to exist on that network node, and where the network nodes in the network include both network devices and user accounts,
     where the attack path modeling component is configured to i) understand an importance of network nodes in the network compared to other network nodes in the network, and ii) determine key pathways within the network and vulnerable network nodes in the network that a cyber-attack would use during the cyber-attack, via modeling the cyber-attack on at least one of 1) a simulated device version and 2) a virtual device version of the network under analysis,
     where the node exposure score generator and the attack path modeling component are configured to cooperate to analyze the actual detected vulnerabilities that exist for that network node in the network, the importance of network nodes in the network compared to other network nodes in the network, and the key pathways within the network and the vulnerable network nodes in the network that a cyber-attack would use during the cyber-attack in order to provide an intelligent prioritization of remediation actions to remediate the actual detected vulnerabilities for a first network node from the network protected by a cyber security appliance, and
     a remediation suggester configured to cooperate with the attack path modeling component to analyze the actual detected vulnerabilities that exist in the first network node and suggest how to intelligently prioritization remediation actions on the first network node compared to other network nodes with actual detected vulnerabilities in at least one of a report and an autonomous remediation action initiated by the remediation suggester to fix a first actual detected vulnerability.

2. The apparatus of claim 1, wherein the software stored in the non-transitory computer readable medium further comprising:
   a Common Vulnerabilities and Exposures (CVE) tracking module is configured to track and profile versions of software and a state of patches and/or updates compared to a latest patch and/or update of the software resident on network devices in the network, where the CVE tracking module is configured to supply results of the comparison of the version of software as a first actual detected vulnerability for a first network node, where the results are utilized by the node exposure score generator and the attack path modeling component in the prioritization of remediation actions on the first network node compared to the other network nodes with actual detected vulnerabilities.

3. The apparatus of claim 2, where the remediation suggester is configured to take autonomous actions of at least one of 1) initiating and causing an update of the state of patches and/or updates to the latest patch and/or update for a first software resident on the first network device and 2) generating a notice to a user of a first user account, whom has been determined to reuse passwords across multiple user accounts, that the user must change their password.

4. The apparatus of claim 1, wherein the software stored in the non-transitory computer readable medium further comprising:
   a user account exposure module is configured to track individual vulnerabilities to the cyber-attack on the network nodes when the network nodes are the user accounts;
   a CVE tracking module is configured to track individual vulnerabilities to the cyber-attack on the network nodes when the network nodes are network devices; and
   where the user account exposure module and the CVE tracking module are configured to keep track of each individual vulnerability on the first network node by name so that then the attack path modeling component and later the remediation suggester can identify that specific vulnerability and know on a certainty level within a context of this particular network, under analysis, why it is important and how to remediate and how to prioritize the actual detected vulnerabilities on the first node compared to the other network nodes in the network with actual detected vulnerabilities.

5. The apparatus of claim 1, wherein the software stored in the non-transitory computer readable medium further comprising:
   a CVE frequency estimator configured to track a frequency of updates of software resident on each network device in the network on their own, where the CVE frequency estimator is further configured to estimate a first time period for a first network device is updated on its own compared to a second time period of when an update is available to be installed on that particular network device; and thus, track and determine for that specific network device a likelihood that this network device will be updated to a latest version of the software on its own and the first time period this updating process takes to occur; and where the attack path modeling component is configured to factor into the intelligent prioritization of remediation actions a current device weakness based on the actual detected vulnerabilities, alongside the attack path modeling making its own calculations of a possibility of the actual detected vulnerabilities being exploited, along with the likelihood that this network device will be updated to the latest version of the software on its own.

6. The apparatus of claim 1, wherein the software stored in the non-transitory computer readable medium further comprising:

a scanner API integrator configured to scan an Internet for vulnerability information as well as to receive vulnerability information from public Common Vulnerabilities and Exposures (CVE) databases to incorporate third party vulnerability information into the computation of the network node's exposure made by the node exposure score generator to the cyber threat and the cyber-attack modeling conducted by the attack path modeling component on the at least one of 1) the simulated device version and 2) the virtual device version of the network under analysis.

7. The apparatus of claim 1, where the attack path modeling component is configured to determine the key pathways within the network and the vulnerable network nodes in the network that the cyber-attack would use during the cyber-attack, via the modeling of the cyber-attack on at least one of 1) the simulated device version and 2) the virtual device version of the network under analysis via using the actual detected vulnerabilities of each network node, a predicted frequency of remediation of those vulnerabilities within a specific network device in the network without a notice from the remediation suggester, and an importance of the key network nodes with the actual vulnerabilities compared to other network nodes in the network.

8. The apparatus of claim 1, where the node exposure score generator is configured to also factor in whether the first network node is exposed to direct contact by an entity generating the cyber threat external to the network or the first network node is downstream of a network node exposed to direct contact by the entity generating the cyber threat external to the network.

9. A non-transitory computer readable medium configure to store data and instruction in an executable format operable, when executed by one or more processor components in a computing device to instruct the computing device to perform operations as follows, comprising:

computing, via a mathematical function, i) a network node's exposure to a cyber threat that originates external to a network and ii) an importance of that network node in the network compared to other network nodes in the network, where each network node's exposure to the cyber threat is based on at least actual vulnerabilities that are detected to exist on that network node, and where the network nodes in the network include both network devices and user accounts;

determining with an attack path modeling component key pathways within the network and vulnerable network nodes in the network that a cyber-attack would use during the cyber-attack, via modeling the cyber-attack on at least one of 1) a simulated device version and 2) a virtual device version of the network under analysis;

using i) the network node's exposure to the cyber threat, ii) the importance of that network node and iii) results from the attack path modeling component on the key pathways within the network and the vulnerable network nodes in the network that the cyber-attack would use during the cyber-attack, to analyze the actual detected vulnerabilities that exist for that network node in the network, under analysis, in order to provide an intelligent prioritization of remediation actions to remediate the actual detected vulnerabilities for a first network node compared to other nodes in the network protected by a cyber security appliance; and analyzing the actual detected vulnerabilities that exist in the first network node and suggesting how to intelligently prioritization remediation actions on the first network node compared to other network nodes with actual detected vulnerabilities in at least one of a report and an autonomous remediation action initiated by the remediation suggester to fix a first actual detected vulnerability.

10. The non-transitory computer readable medium of claim 9 with data and instructions to perform additional operations as follows:

tracking individual vulnerabilities to the cyber-attack on the user accounts in the network; tracking individual vulnerabilities to the cyber-attack on the network nodes;

keeping track of each individual vulnerability on the first network node by name so that then an attack path modeling component and later a remediation suggester can identify that specific vulnerability and know on a certainty level within a context of this particular network, under analysis, why it is important and how to remediate and how to prioritize the actual detected vulnerabilities on the first node compared to the other network nodes in the network with actual detected vulnerabilities.

11. The non-transitory computer readable medium of claim 9 with data and instructions to perform additional operations as follows:

using a CVE tracking module to track and profile versions of software and a state of patches and/or updates compared to a latest patch and/or update of the software resident on network devices in the network, and supplying results of the comparison of the version of software as a first actual detected vulnerability for a first network node, where the results are utilized in the prioritization of remediation actions on the first network node compared to the other network nodes with actual detected vulnerabilities.

12. The non-transitory computer readable medium of claim 11 with data and instructions to perform additional operations as follows:

using a remediation suggester to take autonomous actions of at least one of 1) initiating and causing an update of the state of patches and/or updates to the latest patch and/or update for a first software resident on the first network device and 2) generating a notice to a user of a first user account, whom has been determined to reuse passwords across multiple user accounts, that the user must change their password.

13. The non-transitory computer readable medium of claim 9 with data and instructions to perform additional operations as follows:

tracking a frequency of updates of software resident on each network device in the network on their own, estimating a first time period for a first network device is updated on its own compared to a second time period of when an update is available to be installed on that particular network device; and thus, tracking and determining for that specific network device a likelihood that this network device will be updated to a latest version of the software on its own and the first time period this updating process takes to occur, and factoring into the intelligent prioritization of remediation actions a current device weakness based on the actual detected vulnerabilities, alongside the attack path modeling making its own calculations of a possibility of the actual detected vulnerabilities being exploited by the cyber-attack, along with the likelihood that this network device will be updated to the latest version of the software on its own.

14. The non-transitory computer readable medium of claim 9 with data and instructions to perform additional operations as follows:

scanning an Internet for vulnerability information as well as receiving vulnerability information from public CVE databases to incorporate third party vulnerability information into the computation of the network node's exposure to the cyber threat and the cyber-attack modeling on the at least one of 1) the simulated device version and 2) the virtual device version of the network under analysis.

15. The non-transitory computer readable medium of claim 9 with data and instructions to perform additional operations as follows:

where the determining of the key pathways within the network and the vulnerable network nodes in the network that the cyber-attack would use during the cyber-attack, via the modeling of the cyber-attack on at least one of 1) the simulated device version and 2) the virtual device version of the network under analysis via using the actual detected vulnerabilities of each network node, a predicted frequency of remediation of those vulnerabilities within a specific network device in the network without a notice from the remediation suggester, and an importance of the key network nodes with the actual vulnerabilities compared to other network nodes in the network.

16. The non-transitory computer readable medium of claim 9 with data and instructions to perform additional operations as follows:

also factoring into the prioritization of the remediation actions on the first network node compared to the other network nodes with actual detected vulnerabilities whether the first network node is exposed to direct contact by an entity generating the cyber threat external to the network or the first network node is downstream of a network node exposed to direct contact by the entity generating the cyber threat external to the network.

17. A method for protecting against a cyber threat, comprising:

computing, via a mathematical function, i) a network node's exposure to the cyber threat that originates external to a network and ii) an importance of that network node in the network compared to other network nodes in the network, where each network node's exposure to the cyber threat is based on at least actual vulnerabilities that are detected to exist on that network node, and where the network nodes in the network include both network devices and user accounts;

determining with an attack path modeling component key pathways within the network and vulnerable network nodes in the network that a cyber-attack would use during the cyber-attack, via modeling the cyber-attack on at least one of 1) a simulated device version and 2) a virtual device version of the network under analysis;

using i) the network node's exposure to the cyber threat, ii) the importance of that network node and iii) results from the attack path modeling component on the key pathways within the network and the vulnerable network nodes in the network that the cyber-attack would use during the cyber-attack, to analyze the actual detected vulnerabilities that exist for that network node in the network, under analysis, in order to provide an intelligent prioritization of remediation actions to remediate the actual detected vulnerabilities for a first network node compared to other nodes in the network protected by a cyber security appliance; and analyzing the actual detected vulnerabilities that exist in the first network node and suggesting how to intelligently prioritization remediation actions on the first network node compared to other network nodes with actual detected vulnerabilities in at least one of a report and an autonomous remediation action initiated by the remediation suggester to fix a first actual detected vulnerability.

18. The method of claim 17, further comprising:

tracking individual vulnerabilities to the cyber-attack on the user accounts in the network;

tracking individual vulnerabilities to the cyber-attack on the network nodes; and keeping track of each individual vulnerability on the first network node by name so that then an attack path modeling component and later a remediation suggester can identify that specific vulnerability and know on a certainty level within a context of this particular network, under analysis, why it is important and how to remediate and how to prioritize the actual detected vulnerabilities on the first node compared to the other network nodes in the network with actual detected vulnerabilities.

19. The method of claim 17, further comprising:

tracking a frequency of updates of software resident on each network device in the network on their own, estimating a first time period for a first network device is updated on its own compared to a second time period of when an update is available to be installed on that particular network device; and thus, tracking and determining for that specific network device a likelihood that this network device will be updated to a latest version of the software on its own and the first time period this updating process takes to occur, and factoring into the intelligent prioritization of remediation actions a current device weakness based on the actual detected vulnerabilities, alongside the attack path modeling making its own calculations of a possibility of the actual detected vulnerabilities being exploited by the cyber-attack, along with the likelihood that this network device will be updated to the latest version of the software on its own.

20. The method of claim 17, further comprising:

scanning an Internet for vulnerability information as well as receiving vulnerability information from public CVE databases to incorporate third party vulnerability information into the computation of the network node's exposure to the cyber threat and the cyber-attack modeling on the at least one of 1) the simulated device version and 2) the virtual device version of the network under analysis.

\* \* \* \* \*